United States Patent
Fukushima et al.

(10) Patent No.: US 7,728,900 B2
(45) Date of Patent: Jun. 1, 2010

(54) METHOD AND APPARATUS FOR TAKING PICTURES

(75) Inventors: Mariko Fukushima, Kanagawa-ken (JP); Hiroyuki Miyahara, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 539 days.

(21) Appl. No.: 11/702,098

(22) Filed: Feb. 5, 2007

(65) Prior Publication Data

US 2007/0181687 A1    Aug. 9, 2007

(30) Foreign Application Priority Data

Feb. 7, 2006    (JP)    ............................. 2006-029693
Aug. 30, 2006   (JP)    ............................. 2006-233026

(51) Int. Cl.
*H04N 5/335* (2006.01)
(52) U.S. Cl. ...................... 348/311; 348/294
(58) Field of Classification Search .............. 348/218.1, 348/222.1, 228.1, 220.1, 229.1, 230.1, 231.99, 348/239, 331, 332, 294–324, 350–360; 382/194, 382/199, 209, 258, 298, 299
See application file for complete search history.

(56) References Cited

U.S. PATENT DOCUMENTS

| | | | | |
|---|---|---|---|---|
| 6,639,626 B1 * | 10/2003 | Kubo et al. | ............... | 348/218.1 |
| 7,224,392 B2 * | 5/2007 | Cahill et al. | ................. | 348/315 |
| 2001/0024234 A1 * | 9/2001 | Kubo | ......................... | 348/224 |
| 2006/0221213 A1 * | 10/2006 | Watanabe et al. | ......... | 348/240.3 |

FOREIGN PATENT DOCUMENTS

JP    2004-180240    6/2004

* cited by examiner

*Primary Examiner*—Tuan Ho
*Assistant Examiner*—Don Nguyen
(74) *Attorney, Agent, or Firm*—Louis Woo

(57) ABSTRACT

Detection information is obtained from captured-image information of an imaging element array. An area is provided in an image capturing region in the imaging element array. In response to the obtained detection information, a pattern is generated which defines a ratio of a number of photosensor pixels used to capture an image to a number of all photosensor pixels in the area. The imaging element array is driven in accordance with the generated pattern. Interpolation responsive to a first picture signal generated by the used photosensor pixels in the area is implemented to generate a second picture signal corresponding to unused ones among all the photosensor pixels in the area. The first picture signal and the second picture signal are combined into a captured-image signal. The captured-image signal is outputted at a prescribed frame rate.

8 Claims, 23 Drawing Sheets

FIG. 18
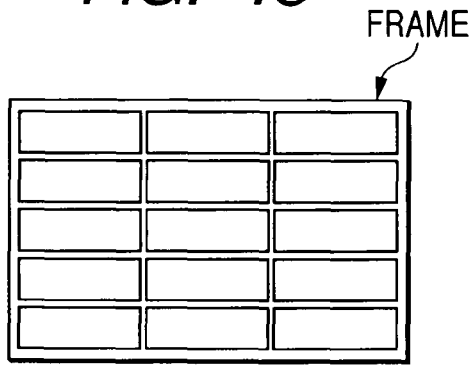
FIG. 19
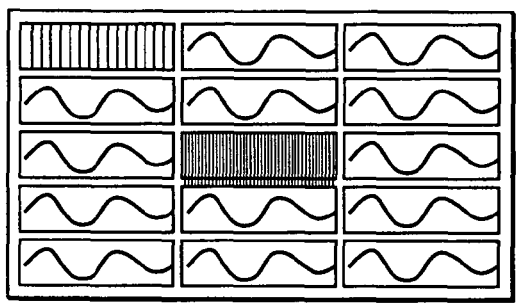
FIG. 20
| 50 | 10 | 10 |
|---|---|---|
| 10 | 10 | 10 |
| 10 | 200 | 10 |
| 10 | 10 | 10 |
| 10 | 10 | 10 |
FIG. 21
| 0.25 | 0.05 | 0.05 |
|---|---|---|
| 0.05 | 0.05 | 0.05 |
| 0.05 | 1.00 | 0.05 |
| 0.05 | 0.05 | 0.05 |
| 0.05 | 0.05 | 0.05 |

FIG. 23

| 4/8  | 4/32 | 4/32 |
|------|------|------|
| 4/32 | 4/32 | 4/32 |
| 4/32 | 4/4  | 4/32 |
| 4/32 | 4/32 | 4/32 |
| 4/32 | 4/32 | 4/32 |

FIG. 24

| 4/32 | 4/32 | 4/32 |
|------|------|------|
| 4/32 | 4/8  | 4/32 |
| 4/32 | 4/4  | 4/32 |
| 4/32 | 4/32 | 4/32 |
| 4/32 | 4/32 | 4/32 |

FIG. 25

| 4/8  | 4/32 | 4/4  |
|------|------|------|
| 4/32 | 4/32 | 4/8  |
| 4/32 | 4/32 | 4/32 |
| 4/32 | 4/32 | 4/32 |
| 4/32 | 4/32 | 4/32 |

| DETECTION TYPE | EXAMPLES | | |
|---|---|---|---|
| EXTERNAL SETTING | (A1) | (A2) | (A3) |
| OPTICAL ZOOM | (B1) | (B2) | |
| EIS CIRCUIT | (C1) | (C2) | |
| AF CIRCUIT | (D1) | (D2) | |
| FACE DETECTION CIRCUIT | (E1) | (E2) | (E3) |

METHOD AND APPARATUS FOR TAKING PICTURES

BACKGROUND OF THE INVENTION

1. Field of the Invention

This invention relates to a method and an apparatus for taking pictures which are suited for use in video cameras such as high-definition television cameras.

2. Description of the Related Art

There is an HDTV (high-definition television) camera including a solid-state imaging element array having a matrix of 1920 photosensor pixels in a horizontal direction and 1080 photosensor pixels in a vertical direction. To output signals from all the photosensor pixels of the imaging element array in a 1-frame interval (1/30 second), it is necessary to drive the imaging element array at a frequency equal to 74 MHz or higher.

As the number of photosensor pixels constituting an imaging element array increases, a necessary frequency of drive of all the photosensor pixels in a 1-frame interval is higher. As the necessary drive frequency is higher, the rate of electric power consumed by a signal processing circuit following the imaging element array and a clock circuit for the drive of the imaging element array increases and also the number of gates in the signal processing circuit increases. Accordingly, it is desirable to provide an apparatus capable of outputting a high-definition picture signal while driving an imaging element array at a relatively low frequency.

Japanese patent application publication number 2004-180240 discloses first and second imaging apparatuses. The first imaging apparatus includes an imaging element array having a matrix of photosensor cells arranged at a high density. The photosensor cells are separated into groups each of neighboring ones. During low-resolution scanning mode of operation, the cell groups are driven to generate low-resolution video data representing a 1-frame picture extending over the whole of the imaging element array. In this case, signals outputted from the photosensor cells in each group are averaged to form a corresponding segment of the low-resolution video data. During high-resolution scanning mode of operation, only ones selected among the photosensor cells which extend in a partial area within the imaging element array are driven to generate high-resolution video data representing a partial-frame picture. The low-resolution scanning mode of operation and the high-resolution scanning mode of operation are sequentially implemented in every 1-frame interval. The generated low-resolution video data and the generated high-resolution vide data are sequentially outputted at higher than a video rate. For every frame, the generated low-resolution video data is processed. The result of the processing of the generated low-resolution video data is used in deciding the place of the partial area relative to the imaging element array for the next frame. Both an output line for a low-resolution video data segment and an output line for a high-resolution video data segment extend from each photosensor cell in the imaging element array.

The second imaging apparatus in Japanese application 2004-180240 is a modification of the first one. In the second imaging apparatus, only a single output line extends from each photosensor cell in an imaging element array. During low-resolution scanning mode of operation, only photosensor cells in equally-spaced selected rows and equally-spaced selected columns of the imaging element array are driven to generate low-resolution video data representing a 1-frame picture substantially extending over the whole of the imaging element array.

The first and second imaging apparatuses in Japanese application 2004-180240 provide only two different fixed picture resolutions.

SUMMARY OF THE INVENTION

It is a first object of this invention to provide a method of taking pictures at two or more variable resolutions.

It is a second object of this invention to provide an apparatus for taking pictures at two or more variable resolutions.

A first aspect of this invention provides a method of taking a picture. The method comprises the steps of obtaining detection information from captured-image information of an imaging element array; providing an area in an image capturing region in the imaging element array; generating, in response to the obtained detection information, a pattern defining a ratio of a number of photosensor pixels used to capture an image to a number of all photosensor pixels in the area; driving the imaging element array in accordance with the generated pattern; implementing interpolation responsive to a first picture signal generated by the used photosensor pixels to generate a second picture signal corresponding to unused ones among all the photosensor pixels in the area; and combining the first picture signal and the second picture signal into a captured-image signal, and outputting the captured-image signal at a prescribed frame rate.

A second aspect of this invention provides a method of taking a picture. The method comprises the steps of obtaining detection information from captured-image information of an imaging element array; providing an area in an image capturing region in the imaging element array; choosing, in response to the obtained detection information, one among different patterns each defining a ratio of a number of photosensor pixels used to capture an image to a number of all photosensor pixels in the area; driving the imaging element array in accordance with the generated pattern; implementing interpolation responsive to a first picture signal generated by the used photosensor pixels to generate a second picture signal corresponding to unused ones among all the photosensor pixels in the area; and combining the first picture signal and the second picture signal into a captured-image signal, and outputting the captured-image signal at a prescribed frame rate.

A third aspect of this invention is based on the first aspect thereof, and provides a method wherein the area includes a first sub-area and a second sub-area, and the pattern prescribes that all photosensor pixels in the first sub-area should be used to capture a related image portion and that ones selected from all photosensor pixels in the second sub-area on a thinning-out basis should be used to capture a related image portion, and wherein a number of the used photosensor pixels in the first and second sub-areas is equal to a predetermined constant number.

A fourth aspect of this invention is based on the first aspect thereof, and provides a method wherein the obtained detection information includes at least one of information about a motion of a subject which occurs after compensation for a shake of the imaging element array, information about a zoom power, motion information based on a motion vector of a subject, still information based on the motion vector of the subject, information about prescribed-frequency components of the captured-image signal which occurs when auto focus is established, and information about a human face represented by the captured-image signal.

A fifth aspect of this invention provides an apparatus for taking a picture. The apparatus comprises an imaging element array having a matrix of photosensor pixels and having an image capturing region; means for obtaining detection information from captured-image information of the imaging element array; means for providing an area in the image capturing region in the imaging element array; means for generating, in response to the obtained detection information, a pattern defining a ratio of a number of photosensor pixels used to capture an image to a number of all photosensor pixels in the area; means for driving the imaging element array in accordance with the generated pattern; means for implementing interpolation responsive to a first picture signal generated by the used photosensor pixels to generate a second picture signal corresponding to unused ones among all the photosensor pixels in the area; and means for combining the first picture signal and the second picture signal into a captured-image signal, and outputting the captured-image signal at a prescribed frame rate.

A sixth aspect of this invention provides an apparatus for taking a picture. The apparatus comprises an imaging element array having a matrix of photosensor pixels and having an image capturing region; means for obtaining detection information from captured-image information of the imaging element array; means for providing an area in the image capturing region in the imaging element array; means for choosing, in response to the obtained detection information, one among different patterns each defining a ratio of a number of photosensor pixels used to capture an image to a number of all photosensor pixels in the area; means for driving the imaging element array in accordance with the generated pattern; means for implementing interpolation responsive to a first picture signal generated by the used photosensor pixels to generate a second picture signal corresponding to unused ones among all the photosensor pixels in the area; and means for combining the first picture signal and the second picture signal into a captured-image signal, and outputting the captured-image signal at a prescribed frame rate.

A seventh aspect of this invention is based on the fifth aspect thereof, and provides an apparatus wherein the area includes a first sub-area and a second sub-area, and the pattern prescribes that all photosensor pixels in the first sub-area should be used to capture a related image portion and that ones selected from all photosensor pixels in the second sub-area on a thinning-out basis should be used to capture a related image portion, and wherein a number of the used photosensor pixels in the first and second sub-areas is equal to a predetermined constant number.

An eighth aspect of this invention is based on the fifth aspect thereof, and provides an apparatus wherein the obtained detection information includes at least one of information about a motion of a subject which occurs after compensation for a shake of the imaging element array, information about a zoom power, motion information based on a motion vector of a subject, still information based on the motion vector of the subject, information about prescribed-frequency components of the captured-image signal which occurs when auto focus is established, and information about a human face represented by the captured-image signal.

This invention has the following advantages. A pattern is generated in response to detection information. According to the generated pattern, optimum weighted signal readout can be implemented with respect to first and second image capturing areas in an imaging element array. The first image capturing area is required to provide a high resolution while the second image capturing area is not. Therefore, it is possible to attain a high resolution for a portion of interest in an image to be captured. On the other hand, low resolutions are provided for other portions of the image. Thus, through the use of a low-frequency drive signal, a captured-image signal can be outputted at a prescribed frame rate.

There are divided areas in an imaging element array. Detection information is obtained for each of the divided areas. In response to the obtained detection information, one is chosen among different patterns each defining a ratio of a number of photosensor pixels used to capture an image to a number of all photosensor pixels in each of the divided areas. According to the chosen pattern, optimum weighted signal readout can be implemented with respect to the divided areas. One of the divided areas is required to provide a high resolution while the others are not. Therefore, it is possible to attain a high resolution for a portion of interest in an image to be captured. On the other hand, low resolutions are provided for other portions of the image. The implementation of the optimum weighted signal readout is quick and easy. It is unnecessary to perform complicated signal processing and provide a complicated circuit for the pattern choice.

There are divided areas in an imaging element array. The divided areas can be designed to provide different resolutions. For example, specified one among the divided areas is designed to provide a high resolution and the others are assigned to low resolutions in a manner such that a resolution corresponding to a place in a frame decreases as the place moves away from the specified divided area. In this case, a resolution variation is gentle in the frame. According to another example, at least two among the divided areas are designed to provide a high resolution. Thus, the divided areas can be assigned to resolutions rich in variety.

BRIEF DESCRIPTION OF THE DRAWINGS

FIG. 18 is a diagram showing an example of division borders and division-result rectangles in one frame.

FIG. 19 is a diagram showing an example of conditions of video data pieces corresponding to the respective division-result rectangles in FIG. 18.

FIG. 20 is a diagram showing an example of the values of variable quantities for the respective division-result rectangles in the case where the video data pieces corresponding to the respective division-result rectangles are in the conditions of FIG. 19.

FIG. 21 is a diagram showing an example of the values of after-normalization variable quantities for the respective division-result rectangles in the case where the values of before-normalization variable quantities are equal to those of the variable quantities in FIG. 20.

FIG. 23 is a diagram of a first pixel-selection-pattern table.

FIG. 24 is a diagram of a second pixel-selection-pattern table.

FIG. 25 is a diagram of a third pixel-selection-pattern table.

DETAILED DESCRIPTION OF THE INVENTION

First Embodiment

Figure 1:
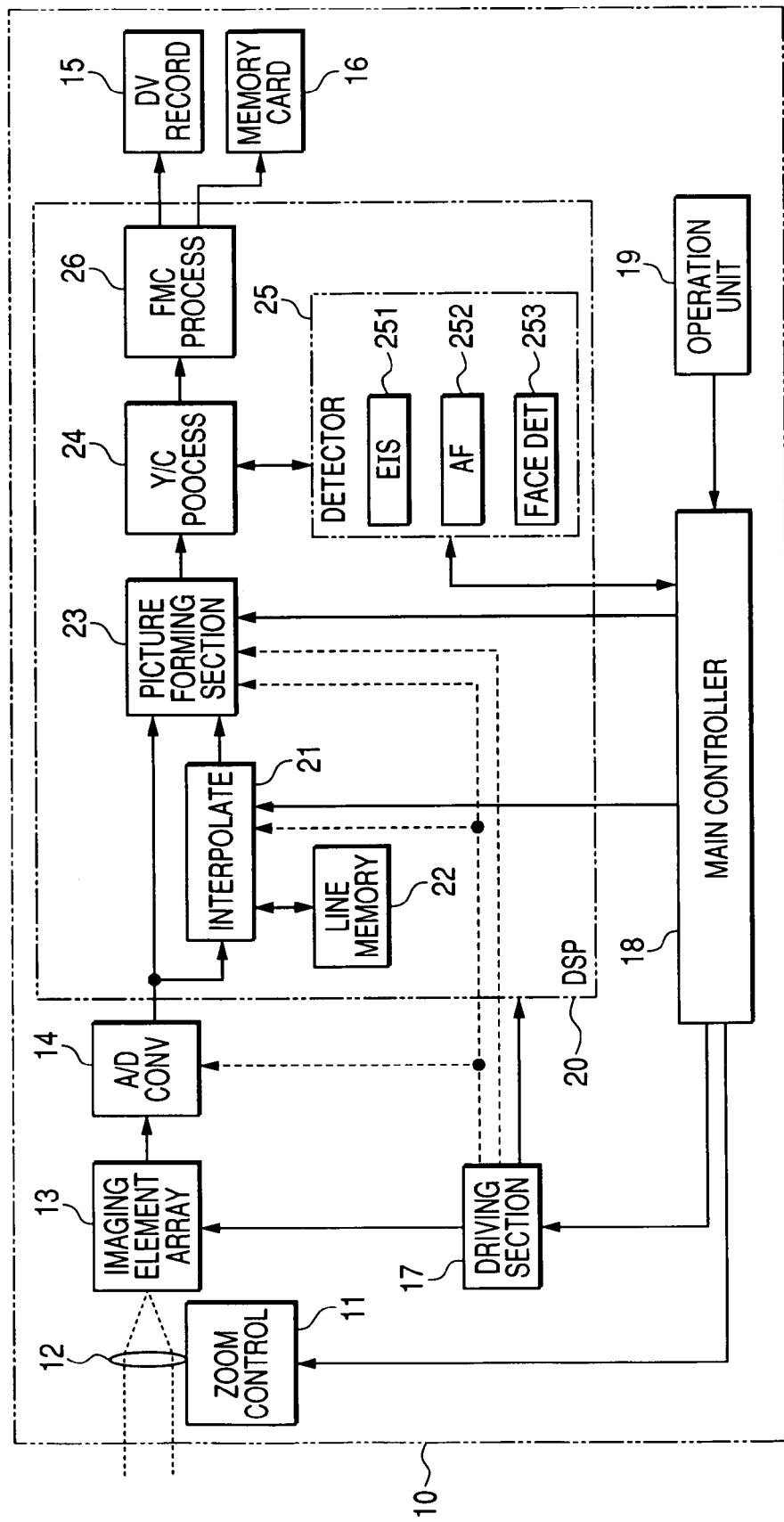
FIG. 1 is a block diagram of an imaging apparatus according to a first embodiment of this invention.

FIG. 1 shows an imaging apparatus 10 according to a first embodiment of this invention. As shown in FIG. 1, the imaging apparatus 10 includes a zoom controller 11, a lens 12, an imaging element array 13, an A/D (analog-to-digital) converter 14, a DV (digital video) recording section 15, a memory card 16, a driving section 17, a main controller 18, an operation unit 19, and a DSP (digital signal processor) 20.

Preferably, the imaging element array 13 is of a high definition type. Further, the imaging element array 13 is of a randomly-accessible type which means that pixels constituting the array can be randomly accessed and signal readout can be implemented on a pixel-by-pixel basis. Specifically, the imaging element array 13 includes, for example, a CMOS image sensor having a matrix of 1600 photosensor pixels in a horizontal direction and 1200 photosensor pixels in a vertical direction where every pixel is formed by one R (red) cell, one G (green) cell, or one B (blue) cell.

The DSP 20 is designed and programmed to function as an interpolating section 21, a line memory 22, a picture forming section 23, a Y/C (luminance signal Y/chrominance difference signals C) processing section 24, a detector 25, and an FMC (field mode change) processing section 26. The picture forming section 23 includes a frame memory provided in the DSP 20. The detector 25 includes an EIS (electronic image stabilization) circuit 251, an AF (auto focus) circuit 252, and a face detection circuit 253. It should be noted that FIG. 1 basically shows a flow of operation of the DSP 20 rather than the hardware structure thereof.

The zoom controller 11 is mechanically connected with the lens 12. The zoom controller 11 is electrically connected with the main controller 18. The lens 12 extends in front of the imaging element array 13. The imaging element array 13 is connected with the A/D converter 14 and the driving section 17. The A/D converter 14 is connected with the driving section 17 and the DSP 20. The DV recording section 15 and the memory card 16 are connected with the DSP 20. The driving section 17 is connected with the main controller 18 and the DSP 20. The main controller 18 is connected with the operation unit 19 and the DSP 20. The operation unit 19 can be accessed by a user.

Figure 2:
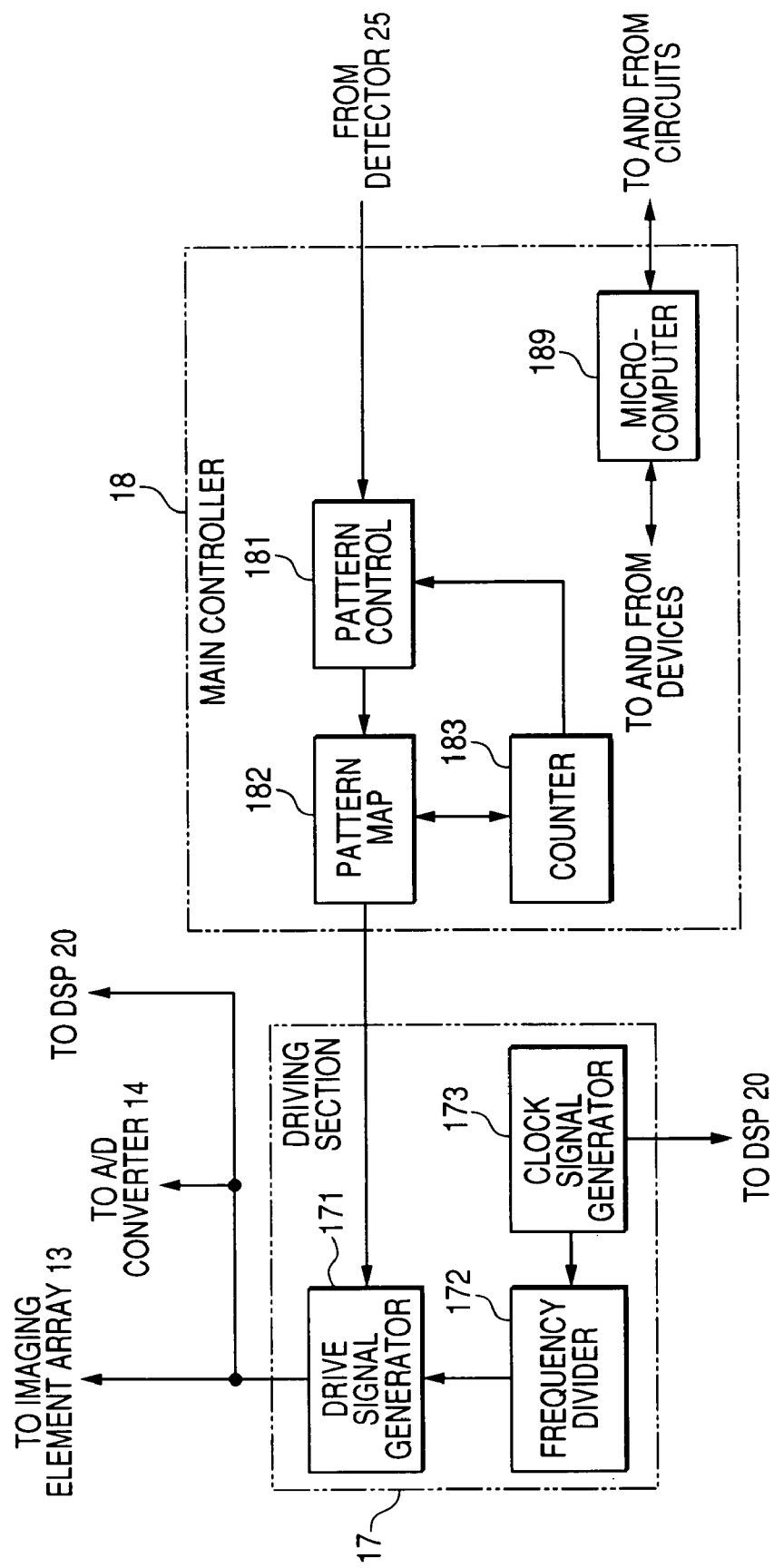
FIG. 2 is a block diagram of a driving section and a main controller in FIG. 1.

As shown in FIG. 2, the driving section 17 includes a drive signal generator 171, a frequency divider 172, and a clock signal generator 173. The drive signal generator 171 is connected with the imaging element array 13, the A/D converter 14, the main controller 18, and the interpolating section 21 and the picture forming section 23 provided by the DSP 20. The frequency divider 172 is connected between the drive signal generator 171 and the clock signal generator 173. The clock signal generator 173 is connected with the DSP 20.

The main controller 18 includes a pattern controller 181, a pattern map 182, a counter 183, and a microcomputer 189. The pattern map 182 is provided by a memory within the main controller 18. The microcomputer 189 includes a CPU. The pattern controller 181 is connected with the detector 25 provided by the DSP 20. The pattern controller 181 is also connected with the pattern map 182 and the counter 183. The pattern map 182 is connected with the counter 183. The pattern map 182 is also connected with the drive signal generator 171 in the driving section 17. The microcomputer 189 is connected with the pattern controller 181, the pattern map 182, and the counter 183. The microcomputer 189 is also connected with the zoom controller 11, the operation unit 19, and the DSP 20.

With reference to FIG. 1, incident light from a subject is applied through the lens 12 to the photo-electric conversion surface of the imaging element array 13 so that a focused image of the subject will be formed thereon. The driving section 17 generates a drive signal for the imaging element array 13. The driving section 17 feeds the generated drive signal to the imaging element array 13. The generated drive signal is designed so that at least one portion of interest in the focused image will be photo-electrically converted into a high-resolution analog picture signal while another portion or other portions (also referred to as a peripheral portion or portions) in the focused image will be photo-electrically converted into a low-resolution analog picture signal, and that the high-resolution analog picture signal and the low-resolution analog picture signal will be outputted from the imaging element array 13 at a prescribed frame rate. The high-resolution analog picture signal is composed of electric signals generated by all photosensor pixels in an area in the imaging element array 13 over which the portion of interest in the focused image extends. The low-resolution analog picture signal is composed of electric signals generated by only ones selected from photosensor pixels in an area or areas in the imaging element array 13 over which the peripheral portion or portions in the focused image extend. The other photosensor pixels in the foregoing area or areas are unused. The selection of the used photosensor pixels is on a thinning-out basis.

There are groups (pixel groups) each having four adjacent photosensor pixels, that is, one R pixel, two G pixels, and one B pixel in the imaging element array 13. Preferably, pixel groups are units for selection of used photosensor pixels. Thus, the high-resolution analog picture signal is composed of electric signals generated by all pixel groups in the area in the imaging element array 13 over which the portion of interest in the focused image extends. The low-resolution analog picture signal is composed of electric signals generated by only thinning-out-result pixel groups in the area or areas in the imaging element array 13 over which the peripheral portion or portions in the focused image extend.

The imaging element array 13 photo-electrically converts the portion of interest in the focused image into the high-resolution analog picture signal and photo-electrically converts the peripheral portion or portions in the focused image into the low-resolution analog picture signal while being driven and controlled by the drive signal from the driving section 17. The imaging element array 13 outputs the high-resolution and low-resolution analog picture signals to the A/D converter 14 while being driven and controlled by the drive signal from the driving section 17. In this way, the imaging element array 13 takes or captures the focused image, and generates the high-resolution and low-resolution analog picture signals representing the taken or captured image.

The A/D converter 14 changes the high-resolution and low-resolution analog picture signals into corresponding high-resolution and low-resolution digital picture signals (high-resolution and low-resolution picture data). The A/D converter 14 outputs the high-resolution and low-resolution digital picture signals to the DSP 20.

The interpolating section 21 provided by the DSP 20 stores the low-resolution digital picture signal in the line memory 22 and implements interpolation responsive to the stored low-resolution digital picture signal to generate interpolation-result picture data corresponding to the unused photosensor pixels in the area or areas in the imaging element array 13 over which the peripheral portion or portions in the focused image extend. The picture forming section 23 provided by the DSP 20 adds or combines the high-resolution and low-resolution picture data from the A/D converter 14 and the interpolation-result picture data generated by the interpolating section 21 to form addition-result 1-frame picture data (combination-result 1-frame picture data). The picture forming section 23 stores the addition-result picture data in the frame memory therein.

The addition-result picture data has three primary color components, that is, R (red) components, G (green) components, and B (blue) components. The Y/C processing section 24 provided by the DSP 20 implements known matrix calculations with respect to the R, G, and B components of the addition-result picture data to generate a luminance signal Y. In addition, the Y/C processing section 24 implements known calculations with respect to the luminance signal Y and the R and B components of the addition-result picture data to generate two chrominance difference signals C. Furthermore, the Y/C processing section 24 performs γ (gamma) correction in the generation of the luminance signal Y and the chrominance difference signals C.

The FMC processing section 26 provided by the DSP 20 processes the luminance signal Y and the chrominance difference signals C generated by the Y/C processing section 24 to implement zoom such as enlargement or reduction with respect to the captured image. Thereby, the FMC processing section 26 generates zoom-result picture signals (Y and C). Basically, the zoom-result picture signals include moving-picture signals and high-resolution still-picture signals. The DSP 20 outputs the moving-picture signals to the DV recording section 15. The DSP 20 outputs the moving-picture signals or the high-resolution still-picture signals to the memory card 16.

The DV recording section 15 records or writes the moving-picture signals in a recording medium, a storage device, or a memory. The memory card 16 stores the high-resolution still-picture signals or the moving-picture signals which represent moving pictures occurring in a relatively short time.

The EIS circuit 251 in the detector 25 provided by the DSP 20 extracts high-frequency components from the luminance signal Y and the chrominance difference signals C generated by the Y/C processing section 24. The EIS circuit 251 refers to the extracted high-frequency components, and thereby calculates a motion in an image portion inclusive of prescribed high-frequency components, for example, a contour-indicating image portion, and detects a shake of the apparatus body (that is, a shake of the imaging element array 13) through the use of the calculated motion. The EIS circuit 251 corrects the luminance signal Y and the chrominance difference signals C in response to the detected shake of the apparatus body to compensate for the shake. Thereby, the EIS circuit 251 generates shake-corrected picture signals (Y and C). The shake-corrected picture signals are handled by the FMC processing section 26. Alternatively, the lens 12 may be moved in accordance with the detected shake of the apparatus body to form a shake-corrected focused image on the photo-electric conversion surface of the imaging element array 13.

The AF circuit 252 in the detector 25 provided by the DSP 20 detects high-frequency components of the luminance signal Y and the chrominance difference signals C generated by the Y/C processing section 24. Under the control by the main controller 18, the AF circuit 252 operates to move the lens 12 along an optical axis through the zoom controller 11 to a position at which the detected high-frequency components are relatively great.

Basically, the face detection circuit 253 in the detector 25 provided by the DSP 20 extracts high-frequency components from the luminance signal Y and the chrominance difference signals C generated by the Y/C processing section 24, and responds to the extracted high-frequency components. Specifically, the face detection circuit 253 detects a human-skin-color portion of the captured image represented by the luminance signal Y and the chrominance difference signals C. The face detection circuit 253 decides whether low-luminance-level zones corresponding to human eyes are present in or absent from the detected human-skin-color portion of the captured image. When such low-luminance-level zones are present in the human-skin-color image portion, the face detection circuit 253 concludes that the human-skin-color image portion corresponds to a human face. Otherwise, the face detection circuit 253 concludes that the human-skin-color image portion does not correspond to a human face.

The main controller 18 receives information about a high-frequency-containing area in the captured image from at least one of the EIS circuit 251, the AF circuit 252, and the face detection circuit 253 provided by the DSP 20. The main controller 18 operates to obtain a high-resolution picture from the high-frequency-containing area in the captured image. Specifically, the main controller 18 generates control signals designed so that a high-frequency-rich area in the focused image (a portion of interest in the focused image) will be captured through the use of all photosensor pixels located therein while another area or other areas in the focused image (peripheral area or areas, that is, peripheral portion or portions in the focused image) will be captured through the use of only selected ones among photosensor pixels located therein.

The microcomputer 189 in the main controller 18 decides whether or not picture signals representing the portion of interest in the captured image and the peripheral portion or portions therein can be outputted from the imaging element array 13 in a prescribed time interval relating with the prescribed frame rate. Specifically, the microcomputer 189 calculates the time interval taken by the imaging element array 13 to output the above-mentioned picture signals. The microcomputer 189 compares the calculated time interval with the prescribed time interval. When the calculated time interval is equal to or shorter than the prescribed time interval, the microcomputer 189 holds unchanged a ratio in size between the portion of interest in the focused image and the peripheral portion or portions therein. On the other hand, when the calculated time interval is longer than the prescribed time interval, the microcomputer 189 changes the ratio.

As previously mentioned, the driving section 17 generates the drive signal for the imaging element array 13 in response to the unchanged or changed ratio. The generated drive signal is designed so that the portion of interest in the focused image will be converted into the high-resolution analog picture signal while the other portion or portions (the peripheral portion or portions) in the focused image will be converted into the low-resolution analog picture signal. The driving section 17 feeds the drive signal to the imaging element array 13. The imaging element array 13 is driven and controlled by the drive signal from the driving section 17, and converts the portion of interest in the focused image into the high-resolution analog picture signal and converts the peripheral portion or portions in the focused image into the low-resolution analog picture signal. The imaging element array 13 outputs the high-resolution and low-resolution analog picture signals.

Thereafter, the detector 25 provided by the DSP 20 detects the high-frequency-containing area in the captured image on the basis of the luminance signal Y and the chrominance difference signals C generated by the Y/C processing section 24. The main controller 18 decides the resolution for the portion of interest in the focused image and the resolution for the peripheral portion or portions therein. Then, the main controller 18 operates to continue the image capturing procedure (the image taking procedure). The microcomputer 189 is connected with the zoom controller 11, the driving section 17, and the DSP 20. The microcomputer 189 is also connected with the pattern controller 181, the pattern map 182, and the counter 183 in the main controller 18. The microcomputer 189 controls the operation of the devices connected therewith.

The imaging apparatus 10 operates in one selected from plural modes including a landscape taking mode and a portrait taking mode.

Figure 3:
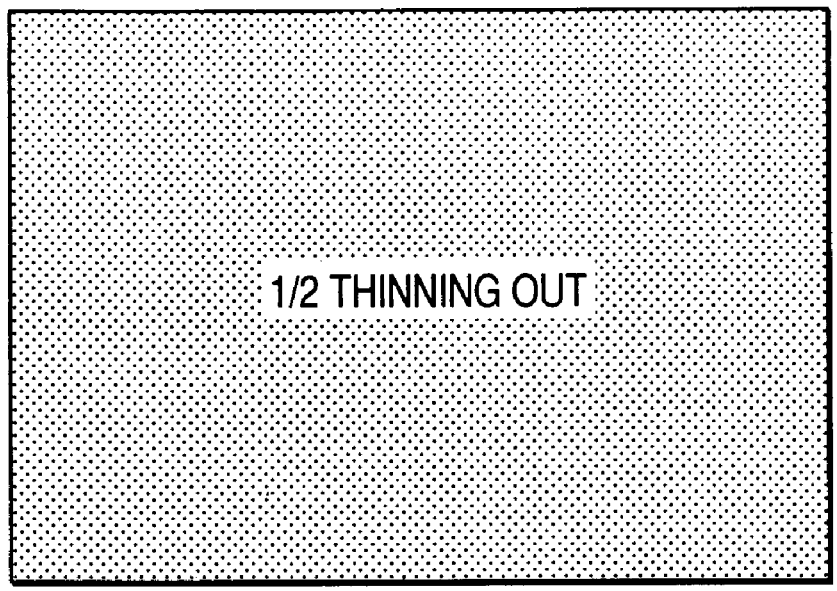
FIG. 3 is a diagram of a frame provided during a landscape taking mode of operation of the imaging apparatus in FIG. 1.

FIG. 3 shows a frame provided during the landscape taking mode of operation of the imaging apparatus 10. The frame is defined by the photo-electric conversion surface of the imaging element array 13. During the landscape taking mode of operation, only half of the photosensor pixels in the whole of the imaging element array 13 are selected on a thinning-out basis as ones used to capture the focused image. In other words, regarding the whole of the imaging element array 13, the used photosensor pixels are thinned out by a factor of 1/2. Accordingly, only signals generated by half of the photosensor pixels in the whole of the imaging element array 13 are read out, and the readout signals constitute a 1-frame picture signal outputted from the imaging element array 13. Therefore, the output picture signal has a relatively low resolution throughout the frame. The pixel-thinning-out factor is also referred to as the weighting factor.

Figure 4:
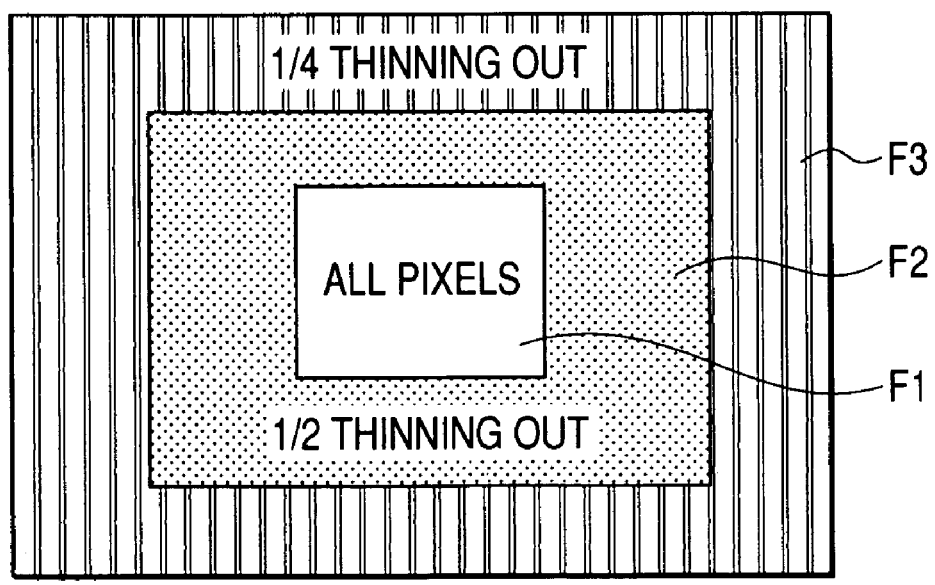
FIG. 4 is a diagram of a frame provided during the portrait taking mode of operation of the imaging apparatus in FIG. 1.

FIG. 4 shows a frame provided during the portrait taking mode of operation of the imaging apparatus 10. The frame is defined by the photo-electric conversion surface of the imaging element array 13. During the portrait taking mode of operation, the frame is divided into a central area F1, an intermediate area F2, and an edge area F3. The intermediate area F2 is located between the central area F1 and the edge area F3. The central area F1 is designed to cover an assumed human face. All photosensor pixels in a portion of the imaging element array 13 which relates to the central frame area F1 are used to capture a corresponding part of the focused image. In other words, signals generated by all the photosensor pixels in the F1-corresponding portion of the imaging element array 13 are read out, and the readout signals constitute a corresponding portion of a 1-frame picture signal outputted from the imaging element array 13. This portion of the 1-frame picture signal has a relatively high resolution. Only half of photosensor pixels in a portion of the imaging element array 13 which relates to the intermediate frame area F2 are selected on a thinning-out basis as ones used to capture a corresponding part of the focused image. In other words, regarding the F2-corresponding portion of the imaging element array 13, the used photosensor pixels are thinned out by a factor of 1/2. Accordingly, only signals generated by half of the photosensor pixels in the F2-corresponding portion of the imaging element array 13 are read out, and the readout signals constitute a corresponding portion of the 1-frame picture signal outputted from the imaging element array 13. This portion of the 1-frame picture signal has a first low resolution. Only one fourth of photosensor pixels in a portion of the imaging element array 13 which relates to the edge frame area F3 are selected on a thinning-out basis as ones used to capture a corresponding part of the focused image. In other words, regarding the F3-corresponding portion of the imaging element array 13, the used photosensor pixels are thinned out by a factor of 1/4. Accordingly, only signals generated by one fourth of the photosensor pixels in the F3-corresponding portion of the imaging element array 13 are read out, and the readout signals constitute a corresponding portion of the 1-frame picture signal outputted from the imaging element array 13. This portion of the 1-frame picture signal has a second low resolution less than the first low resolution.

It is preferable that the total number of the photosensor pixels selected and used for every frame during the landscape taking mode of operation is equal to that during the portrait taking mode of operation.

When a user actuates the operation unit 19, a signal depending on the actuation is outputted from the operation unit 19 to the main controller 18. The output signal from the operation unit 19 reflects, for example, user's request. The main controller 18 can set or select one among the operation modes in response to the output signal from the operation unit 19. In this case, the main controller 18 designates one among previously-provided area patterns (pixel-thinning-out patterns, pixel selection patterns, signal readout patterns) in accordance with the selected operation mode. The main controller 18 can set automatic change among the operation modes. In the case where the automatic change among the operation modes is set, the main controller 18 accesses the AF circuit 252 in the detector 25 provided by the DSP 20 to receive information about the distance to the point of focus. The main controller 18 compares the distance to the point of focus with a predetermined reference value equal to, for example, 4 m. When the distance to the point of focus is greater than the predetermined reference value (for example, 4 m), the main controller 18 selects the landscape taking mode of operation. On the other hand, when the distance to the point of focus is equal to or less than the predetermined reference value, the main controller 18 selects the portrait taking mode of operation. In the case where the automatic change among the operation modes is set, the main controller 18 accesses the face detection circuit 253 in the detector 25 provided by the DSP 20 to receive information about the position of a detected human face relative to a frame. The main controller 18 decides whether or not the position of the detected human face is in a predetermined central zone in a frame. When the position of the detected human face is in the predetermined central zone in a frame, the main controller 18 selects the portrait taking mode of operation. Otherwise, the main controller 18 selects another operation mode.

During the landscape taking mode of operation, the imaging element array 13 outputs ½-thinned-out pixel data (low-resolution pixel data) at a rate of 30 frames per second. During the portrait taking mode of operation, the imaging element array 13 outputs full pixel data (high-resolution pixel data), ½-thinned-out pixel data (low-resolution pixel data), and ¼-thinned-out pixel data (low-resolution pixel data) at a rate of 30 frames per second.

The thinning-out of the used photosensor pixels would cause a shortage of the number of 1-pixel-corresponding segments of a 1-frame picture signal which is compensated for by the following actions. The interpolating section 21 provided by the DSP 20 implements interpolation responsive to the low-resolution pixel data transmitted from the imaging element array 13 through the A/D converter 14 to generate interpolation-result pixel data. The low-resolution pixel data and the interpolation-result pixel data are combined and processed by the picture forming section 23 and the Y/C processing section 24 provided by the DSP 20. As a result, the Y/C processing section 24 generates a luminance signal Y and chrominance difference signals C corresponding to all the photosensor pixels of the imaging element array 13. The main controller 18 controls the drive of the imaging element array 13 through the driving section 17 in accordance with the designated pixel-thinning-out pattern. At the same time, the FMC processing section 26 provided by the DSP 20 processes the luminance signal Y and the chrominance difference signals C generated by the Y/C processing section 24 to implement enlargement or reduction with respect to the captured image.

With reference to FIG. 2, the pattern controller 181 in the main controller 18 receives information about the high-frequency components of the picture signal which are detected by the EIS circuit 251, the AF circuit 252, and the face detection circuit 253 in the detector 25 provided by the DSP 20. The pattern controller 181 generates information about the resolution of an image to be captured on the basis of the received high-frequency-component information. The pattern map 182 decides a pattern (a pixel selection pattern or a pixel-thinning-out pattern) in response to the resolution-related information generated by the pattern controller 181. The pattern map 182 may decide a pattern in response to user's request fed through the microcomputer 189. The pattern defines, for example, a high-resolution area and a low-resolution area or areas in the photo-electric conversion surface of the imaging element array 13. The pattern designates, among all the photosensor pixels of the imaging element array 13, ones to be selected and used for the capture of the focused image. The high-resolution area means that all photosensor pixels therein are selected as ones used to capture a corresponding part of the focused image. Each of the low-resolution areas means that ones are selected from photosensor pixels therein on a thinning-out basis with a factor equal to ½, ¼, or another fraction, and the selected photosensor pixels are used to capture a corresponding part of the focused image. The pattern map 182 informs the drive signal generator 171 in the driving section 17 of the decided pattern. The counter 183 calculates the number of 1-pixel-group corresponding segments of the picture signal outputted from the imaging element array 13 for every frame. To this end, the counter 183 has a connection (not shown) with the imaging element array 13. The counter 183 may estimate or calculate the number of selected and used ones among the pixel groups in the imaging element array 13 by referring to, for example, the pattern decided by the pattern map 182.

Preferably, the pattern map 182 includes tables of predetermined patterns (predetermined pixel selection patterns). The pattern map 182 chooses one among the predetermined patterns as a decided pattern in response to at least one of the resolution-related information and the user's request.

The microcomputer 189 accesses the counter 183 to receive information about the number of 1-pixel-group corresponding segments of the picture signal outputted from the imaging element array 13 for every frame. The microcomputer 189 compares the calculated number of 1-pixel-group corresponding segments of the picture signal with a predetermined reference number (a prescribed constant number). When the calculated number is greater than the reference number, the microcomputer 189 concludes the outputting of picture data at a frame frequency of 30 Hz to be difficult. Otherwise, the microcomputer 189 concludes the outputting of picture data at a frame frequency of 30 Hz to be possible. When the outputting of picture data at a frame frequency of 30 Hz is concluded to be difficult, the microcomputer 189 generates an adjustment signal for reducing the size of the high-resolution area or changing the pixel-thinning-out factor or factors concerning the low-resolution area or areas. The microcomputer 189 feeds the adjustment signal to the pattern controller 181. The pattern controller 181 corrects the resolution-related information in response to the adjustment signal. The pattern map 182 decides a new pattern in accordance with the corrected resolution-related information. The new pattern defines a corrected resolution-related condition. The pattern map 182 informs the drive signal generator 171 in the driving section 17 of the new pattern.

It should be noted that the microcomputer 189 may further access the counter 183 to receive information about the calculated number of selected and used ones among the pixel groups in the imaging element array 13. In this case, the microcomputer 189 compares the calculated number of selected and used pixel groups with the predetermined reference number (the prescribed constant number). Then, the microcomputer 189 utilizes the result of the comparison for the generation of the adjustment signal.

The clock signal generator 173 in the driving section 17 generates a clock signal for driving the DSP 20 and the frequency divider 172. The clock signal generator 173 feeds the clock signal to the DSP 20 and the frequency divider 172. The picture forming section 23 provided by the DSP 20 includes a memory which can store 1-frame picture data composed of 1-pixel-corresponding segments originating from signals generated by all the photosensor pixels in the imaging element array 13. The DSP 20 stores the picture data from the A/D converter 14, and implements interpolation with respect to the stored picture data and correction of picture characteristics. The frequency divider 172 divides the frequency of the clock signal from the cock signal generator 173 by a predetermined value to generate a frequency-division-result clock signal. The frequency divider 172 feeds the frequency-division-result clock signal to the drive signal generator 171.

The drive signal generator 171 produces a drive signal for the imaging element array 13 in response to the frequency-division-result clock signal from the frequency divider 172 and the decided pattern from the pattern map 182. The drive signal is synchronized with the frequency-division-result clock signal. The drive signal generator 171 feeds the drive signal to the imaging element array 13. The imaging element array 13 operates while being driven and controlled by the drive signal from the drive signal generator 171. Signals are read out from only the photosensor pixels designated and selected by the decided pattern among all the photosensor pixels of the imaging element array 13. The readout signals constitute a captured-image signal outputted from the imaging element array 13.

Specifically, the drive signal generator 171 produces a horizontal-direction address signal, a vertical-direction address signal, and a readout clock signal. The drive signal generator 171 feeds the horizontal-direction address signal, the vertical-direction address signal, and the readout clock signal to the imaging element array 13. The horizontal-direction address signal and the vertical-direction address signal indicate the position of a photosensor pixel to be accessed, that is, a photosensor pixel from which a signal should be read out. The horizontal-direction address signal and the vertical-direction address signal are periodically updated to change the accessed photosensor pixel from one to another. The readout clock signal allows the readout of a signal from the accessed photosensor pixel. Photosensor pixels from which signals should not be read out are reset in accordance with a reference signal for every specified period.

With reference back to FIG. 1, the imaging element array 13 outputs an analog captured-image signal (analog full-pixel picture data or analog pixel-thinned-out picture data) to the A/D converter 14 in response to the readout clock signal. The A/D converter 14 converts the analog captured-image signal into a digital captured-image signal (digital full-pixel picture data or digital pixel-thinned-out picture data) in response to the readout clock signal generated by the driving section 17. The A/D converter 14 feeds the digital captured-image signal (the digital captured-image data) to the DSP 20.

The interpolating section 21 provided by the DSP 20 stores the pixel-thinned-out picture data in the line memory 22 and implements linear or curved interpolation responsive to the stored thinned-out pixel picture data to generate interpolation-result picture data corresponding to the unused photosensor pixels in the imaging element array 13. The picture forming section 23 provided by the DSP 20 adds or combines the captured-image data from the A/D converter 14 and the interpolation-result picture data generated by the interpolating section 21 to form addition-result picture data (combination-result picture data). The picture forming section 23 stores the addition-result picture data in the frame memory therein. The size of the picture data stored in the picture forming section 23 is equal to the size of pixel data which can be generated by the imaging element array 13 during the capture of the focused image.

The imaging element array 13 has a matrix of, for example, 1600 photosensor pixels in a horizontal direction and 1200 photosensor pixels in a vertical direction. To read out signals from all the photosensor pixels of the imaging element array 13 in a time interval of 1/60 second, a theoretical required frequency of a drive signal therefor is equal to about 115 MHz (=1600 by 1200 by 60). On the other hand, the actual frequency of the drive signal fed to the imaging element array 13 from the drive signal generator 171 in the driving section 17 is set to, for example, 28.75 MHz (=115/4 MHz).

Such a low frequency of the drive signal for the imaging element array 13 is prevented from causing a problem for the reason as follows. The photo-electric conversion surface of the imaging element array 13 can be virtually divided into a plurality of areas. At least one of the areas is defined as a high-resolution area providing one predetermined effective high resolution. The other area or areas are defined as a low-resolution area or areas. The low-resolution area or areas provide one predetermined effective low resolution. The low-resolution areas may provide two or more different predetermined effective low resolutions. The whole of the photo-electric conversion surface of the imaging element array 13 may be set as one low-resolution area. Signals are read out from all photosensor pixels in the high-resolution area to form full-pixel picture data. On the other hand, signals are read out from only ones selected among all photosensor pixels in the low-resolution area or each of the low-resolution areas on a thinning-out basis to form pixel-thinned-out picture data. In this case, the ratio between the number of the selected and used photosensor pixels and the number of all the photosensor pixels depends on the effective resolution provided by the related low-resolution area. The ratio means the pixel-thinning-out factor. For a moving subject, a desired area is set as a high-resolution area and pixel data can be obtained at the prescribed frame rate although the frequency of the drive signal for the imaging element array 13 is relatively low. When a high-resolution area is positioned so as to correspond to a portion of a subject about which a high resolution is desired, high-resolution picture data representing an image of that portion of the subject is obtained.

Figure 5:
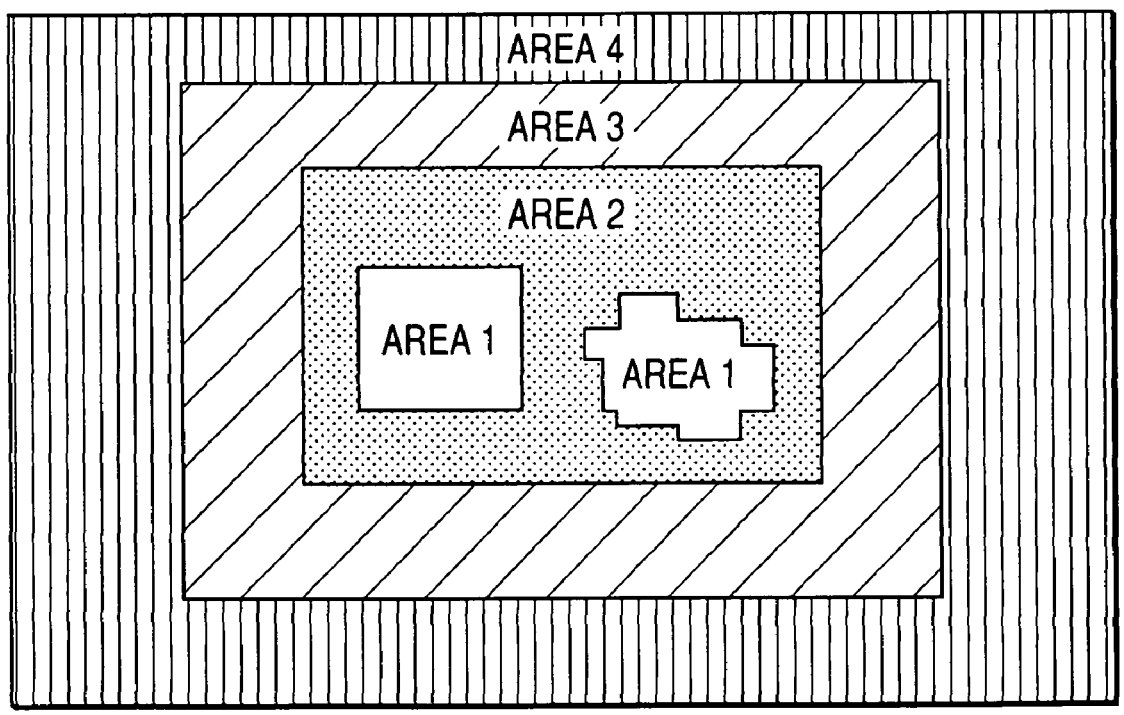
FIG. 5 is a diagram showing an example of the division of a frame into a plurality of areas according to a pixel selection pattern (a signal readout pattern).

FIG. 5 shows an example of the pattern (the pixel selection pattern or the signal readout pattern) decided by the pattern map 182. The pattern in FIG. 5 indicates a frame divided into areas "1", "2", "3", and "4" having four different resolutions. The number of division-result areas and the shape of each division-result area can be arbitrarily set according to the decided pattern. The two areas "1" extend in a central part of the frame, and correspond to high-resolution areas in the imaging element array 13. Signals are read out from all photosensor pixel groups in each of the high-resolution areas to form full-pixel picture data having a high resolution. The area "2" surrounds the areas "1". The area "2" corresponds to a first low-resolution area (also referred to as a first intermediate-resolution area) in the imaging element array 13 which relates to a pixel-thinning-out factor of 4/6. Substantially, signals are read out from only four photosensor pixel groups among every six photosensor pixel groups in the first low-resolution area to form pixel-thinned-out picture data having a first low resolution (a first intermediate resolution) less than the foregoing high resolution. The area "3" surrounds the area "2". The area "3" corresponds to a second low-resolution area (also referred to as a second intermediate-resolution area) in the imaging element array 13 which relates to a pixel-thinning-out factor of 2/4. Signals are read out from only two photosensor pixel groups among every four photosensor pixel groups in the second low-resolution area to form pixel-thinned-out picture data having a second low resolution (a second intermediate resolution) less than the first low resolution. The area "4" surrounds the area "3". The area "4" corresponds to a third low-resolution area in the imaging element array 13 which relates to a pixel-thinning-out factor of 1/4. Signals are read out from only one photosensor pixel group among every four photosensor pixel groups in the third low-resolution area to form pixel-thinned-out picture data having a third low resolution less than the second low resolution. According to the decided pattern in FIG. 5, the resolution at a place decreases as the place moves from the center of the frame to an edge thereof.

Figure 6:
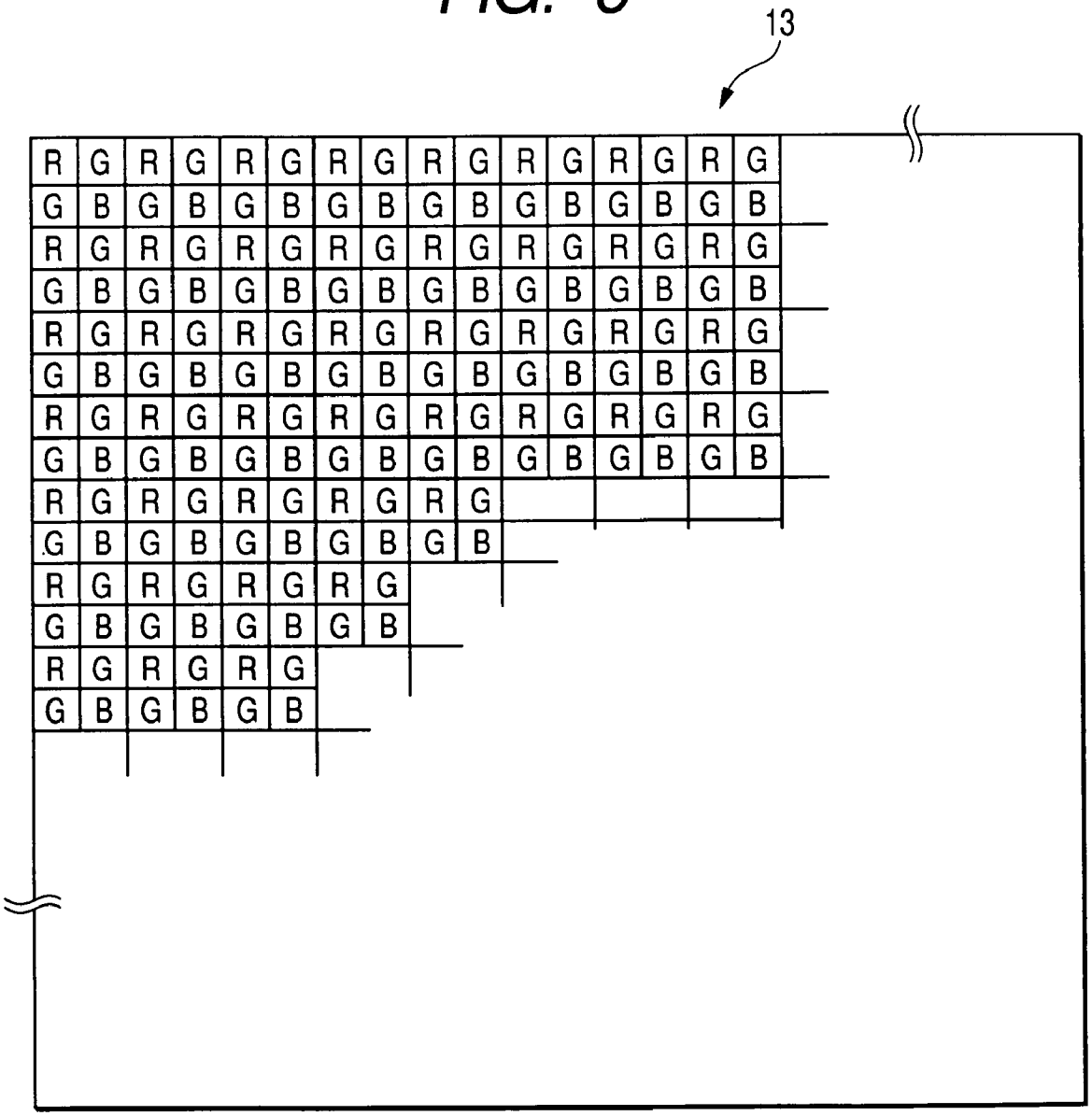
FIG. 6 is a diagram of an example of the arrangement of photosensor pixels in an imaging element array in FIG. 1.
Figure 7:
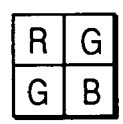
FIG. 7 is a diagram of a group of photosensor pixels.

As shown in FIG. 6, the imaging element array 13 has a matrix of R, G, and B pixels. There are groups each having four photosensor pixels, that is, one R pixel, two G pixels, and one B pixel which are arranged as shown in FIG. 7. These pixel groups are units for selection of used photosensor pixels. All photosensor pixels, that is, all pixel groups in each of the areas "1" in FIG. 5 are used to capture a corresponding part of the focused image. In other words, signals are read out from all the photosensor pixels or all the pixel groups in each of the areas "1". The size of division-result areas is variable by at least one pixel group.

Figures 8, 9:
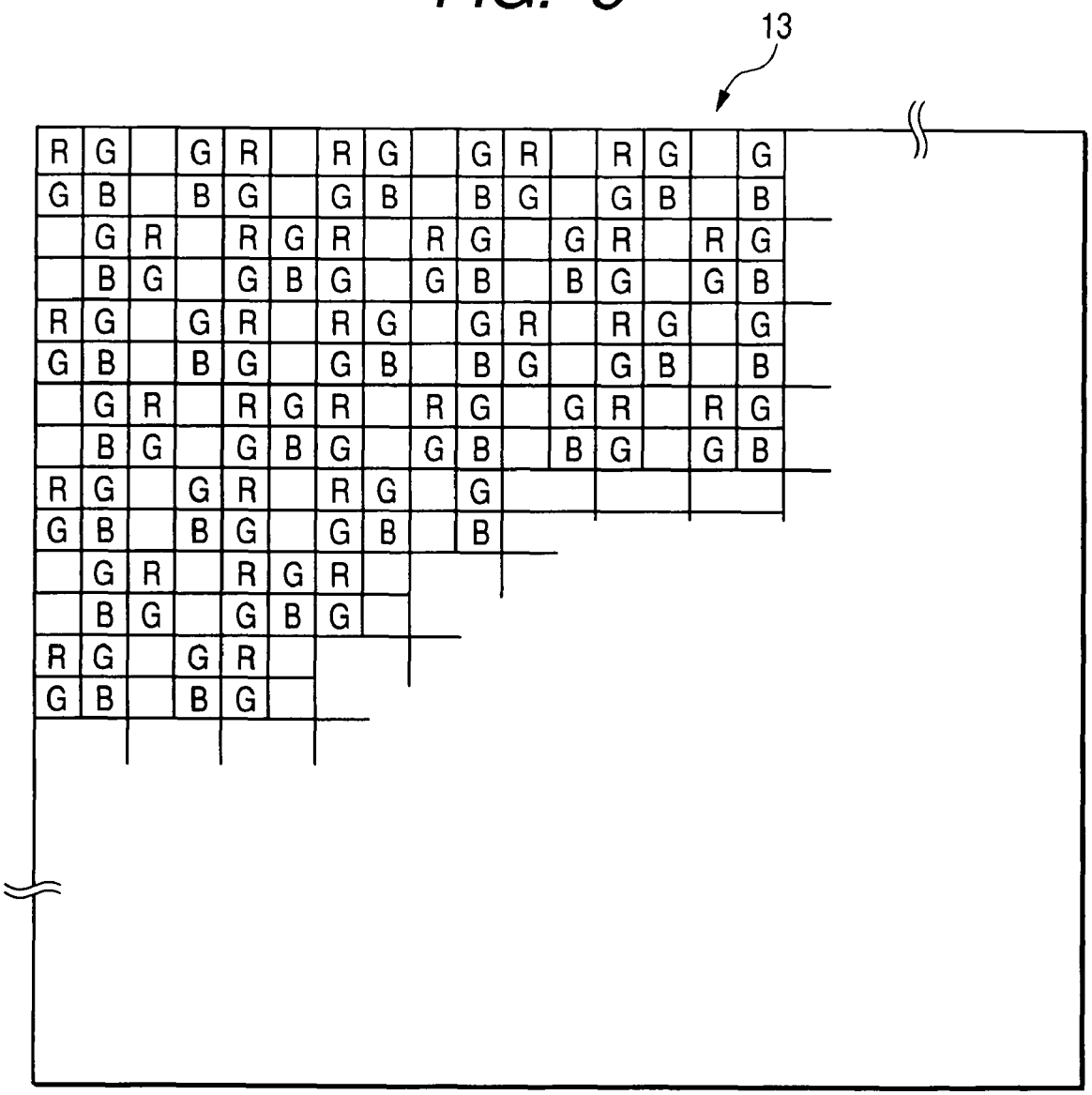
FIG. 8 is a diagram of a first example of the arrangement of selected and used photosensor pixels in the imaging element array in FIG. 1.
FIG. 9 is a diagram of a unit composed of 6 pixel groups having selected and used photosensor pixels and non-selected and non-used photosensor pixels.

FIG. 8 shows used photosensor pixels in the area "2" (see FIG. 5). The used photosensor pixels are selected on a 4/6 thinning-out basis. In the area "2", there are units each having six adjacent pixel groups, that is, three pixel groups in the horizontal direction by two pixel groups in the vertical direction. With reference to FIG. 9, in each unit, signals are read out from all the photosensor pixels in the left-upper pixel group. Signals are read out from only the right G pixel and the right B pixel in the center-upper pixel group. Signals are read out from only the left R pixel and the left G pixel in the right-upper pixel group. Signals are read out only the right G pixel and the right B pixel from the left-lower pixel group. Signals are read out from only the left R pixel and the left G pixel in the center-lower pixel group. Signals are read out from all the photosensor pixels in the right-lower pixel group. Accordingly, used photosensor pixels are thinned out by a factor of 4/6. Used pixel groups are substantially thinned out by a factor of 4/6. Thus, 4-pixel-group data are read out from every 6-pixel-group portion (every unit) of the area "2".

Figure 10:
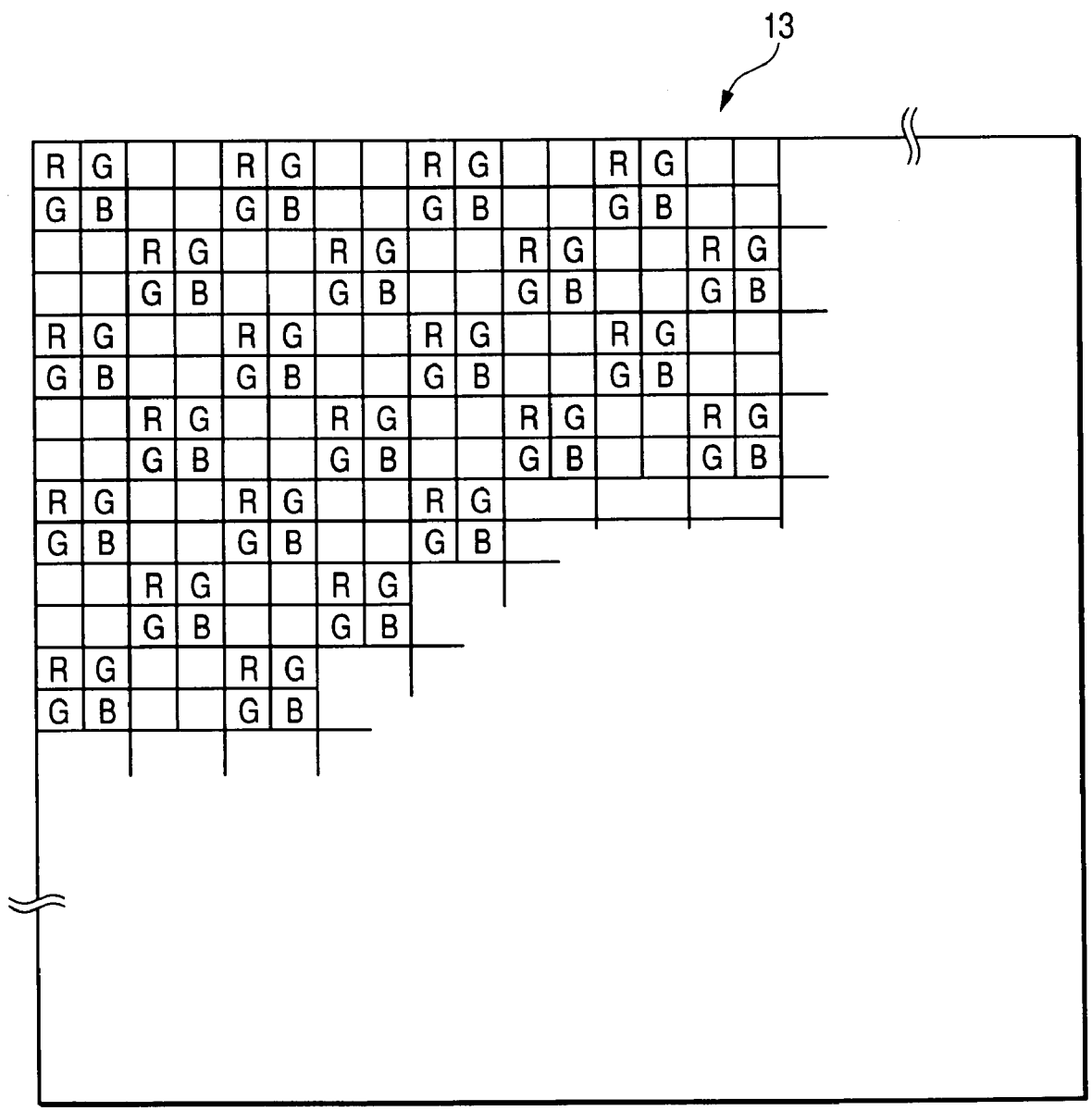
FIG. 10 is a diagram of a second example of the arrangement of selected and used photosensor pixels in the imaging element array in FIG. 1.

FIG. 10 shows used photosensor pixels in the area "3" (see FIG. 5). The used photosensor pixels are selected on a 2/4 thinning-out basis. In the area "3", alternate ones of pixel groups are selected as used ones. The used pixel groups are in a staggered fashion between rows over the area "3" which can suppress decreases in horizontal-direction and vertical-direction resolutions, and which can facilitate the interpolation to generate picture data corresponding to the unused pixel groups. Signals are read out from all the photosensor pixels in every selected and used pixel group in the area "3".

Figure 11:
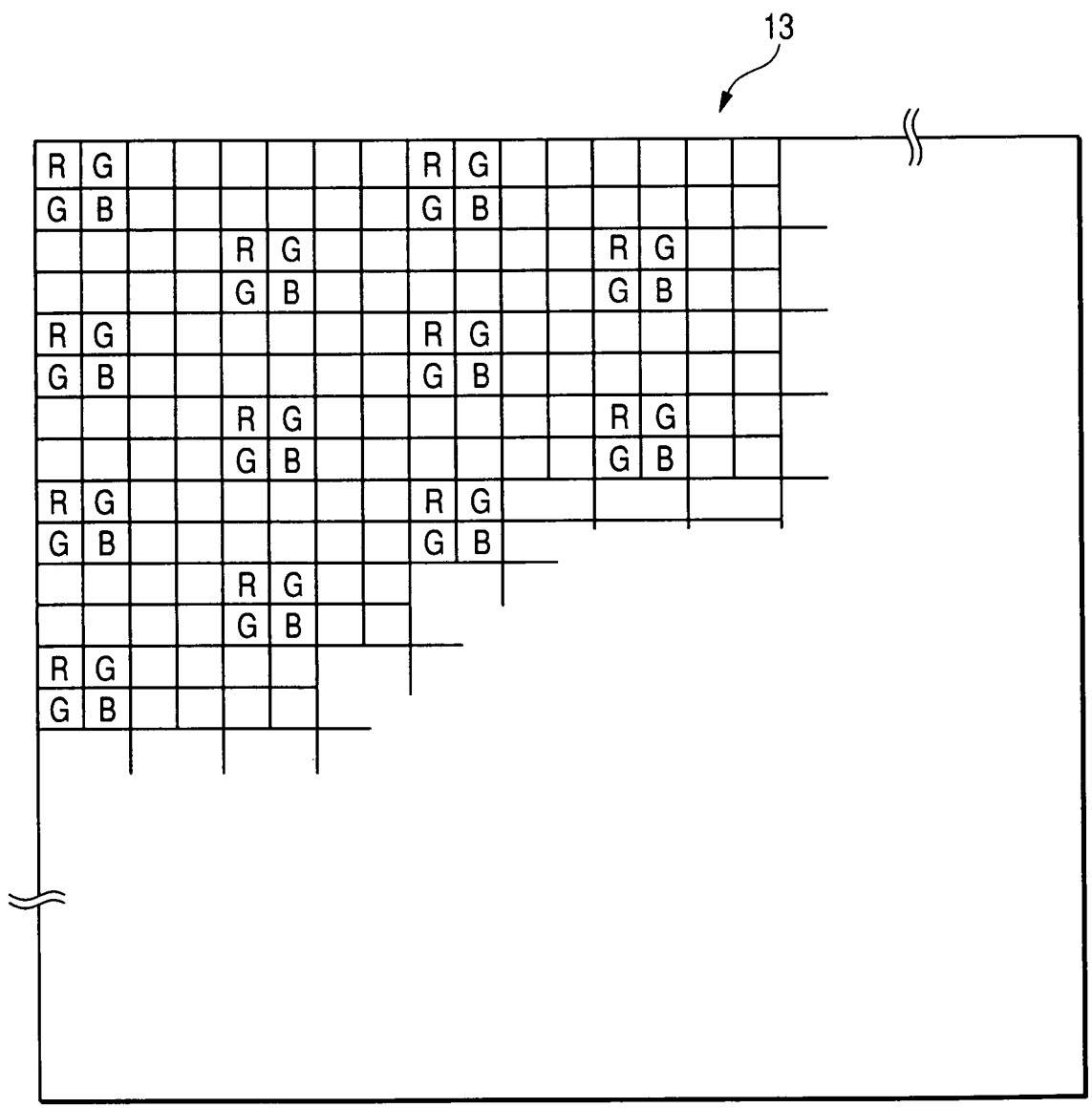
FIG. 11 is a diagram of a third example of the arrangement of selected and used photosensor pixels in the imaging element array in FIG. 1.

FIG. 11 shows used photosensor pixels in the area "4" (see FIG. 5). The used photosensor pixels are selected on a 1/4 thinning-out basis. In each pixel-group line (row) of the area "4", every fourth pixel groups are selected as used ones. The used pixel groups are in a staggered fashion between rows over the area "4". Signals are read out from all the photosensor pixels in every selected and used pixel group in the area "3".

The above-mentioned way of thinning out the used photosensor pixels may be replaced by one of other ways. Preferably, there are units each having a given number of pixel groups. In the case where the relation between the number of pixel groups constituting one unit and the number of used pixel groups in the unit is fixed, the way of the interpolation implemented by the interpolating section 21 can be uniquely decided so that the interpolation can be facilitated.

As previously mentioned, the imaging apparatus 10 includes the main controller 18. As shown in FIG. 2, the main controller 18 has the pattern controller 181, the pattern map 182, the counter 183, and the microcomputer 189. The pattern map 182 decides the pattern (the pixel selection pattern) in response to the resolution-related information generated by the pattern controller 181. The pattern map 182 may decide the pattern in response to the user's request fed via the microcomputer 186. The decided pattern defines, for example, a high-resolution area and a low-resolution area or areas in the photo-electric conversion surface of the imaging element array 13. The decided pattern can be corrected or updated. Preferably, the corrected or updated pattern is designed to equalize the total number of selected and used photosensor pixels in the high-resolution area and the low-resolution area or areas to a constant number (a fixed number) at which signals can be read out from all the selected and used photosensor pixels in the imaging element array 13 with a prescribed data output frequency. This designing of the decided pattern results in a corrected picture represented by the output signal from the imaging element array 13. The counter 183 calculates the number of pixel groups constituting a 1-frame picture represented by the output signal from the imaging element array 13. Alternatively, the counter 183 may estimate or calculate the number of selected and used pixel groups (active pixel groups) in the imaging element array 13 by referring to, for example, the pattern decided by the pattern map 182. The microcomputer 189 accesses the counter 183 to receive information about the calculated pixel-group number. The microcomputer 189 compares the calculated pixel-group number with the reference number at which signals can be read out from all the selected and used pixel groups in the imaging element array 13 with the prescribed data output frequency. When the calculated pixel-group number is equal to or less than the reference number, the microcomputer 189 controls the driving section 17 through the pattern controller 181 and the pattern map 182 to allow the outputting of the picture signal from the imaging element array 13 which accords with the current decided pattern. On the other hand, when the calculated pixel-group number is greater than the reference number, the microcomputer 189 controls the pattern controller 181 and the pattern map 182 to correct or update the current decided pattern.

Figure 12:
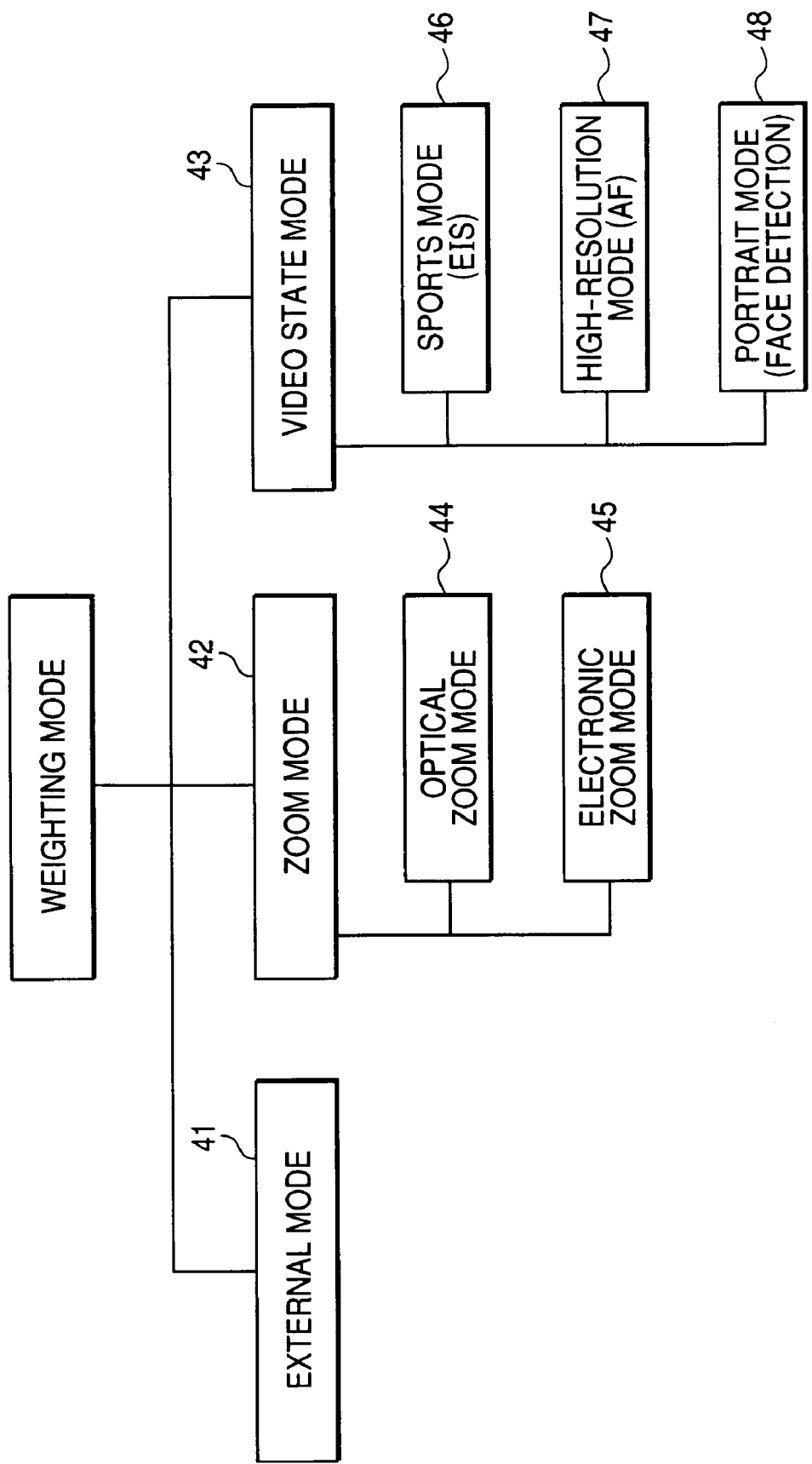
FIG. 12 is a diagram showing the hierarchy of weighting modes of operation of the imaging apparatus in FIG. 1.

The imaging apparatus 10 can operate in a weighting mode selected from an external mode 41, a zoom mode 42, and a video state mode 43 as shown in FIG. 12. During the external mode 41 of operation, fixed weighting is implemented in accordance with user's request. During the video state mode 42 of operation, the pattern (the pixel selection pattern or the signal readout pattern) is decided in response to conditions of video information in the output signal from the imaging element array 13. The zoom mode 42 has an optical zoom mode 44 and an electronic zoom mode 45. The video state mode 43 has a sports mode 45 utilizing the EIS circuit 251, a high-resolution mode 47 utilizing the AF circuit 252, and a portrait mode 48 utilizing the face detection circuit 253.

The user can input a mode selection request into the imaging apparatus 10 by actuating the operation unit 19. The mode selection request indicates which of the above-mentioned weighting modes should be selected. The inputted mode selection request is sent from the operation unit 19 to the main controller 18.

The main controller 18 (the microcomputer 189) operates in accordance with a computer program. The main controller 18 (the microcomputer 189) includes a memory storing the computer program.

Figure 13:
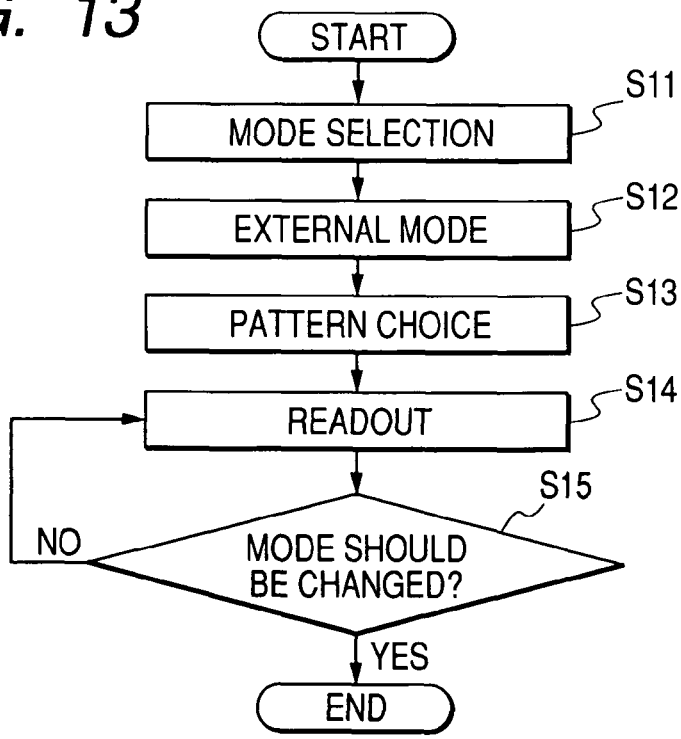
FIG. 13 is a flowchart of a segment of a control program which relates to an external mode of operation.

FIG. 13 is a flowchart of a segment (a subroutine) of the control program which relates to the external mode 41 of operation. As shown in FIG. 13, a first step S11 of the program segment waits for a mode selection request. When a mode selection request comes in, the program advances from the step S11 to a step S12.

The step S12 determines whether or not the mode selection request indicates that the external mode 41 should be selected. When the mode selection request indicates that the external mode 41 should be selected, the program advances from the step S12 to a step S13. Otherwise, the program exits from the step S12, and then the current execution cycle of the program segment ends.

The step S13 controls the pattern map 182 to choose, among the predetermined patterns (the predetermined pixel selection patterns or the predetermined signal readout patterns), one designed for the external mode 41. The step S13 labels the chosen pattern as the decided pattern.

A step S14 following the step S13 controls the driving section 17 in accordance with the decided pattern to implement the readout of signals from selected and used photosensor pixels in the imaging element array 13. The selected and used photosensor pixels are designated by the decided pattern. The number of the selected and used photosensor pixels is equal to or less than the prescribed value at which the outputting of a 1-frame picture signal with the prescribed frame rate is possible.

A step S15 subsequent to the step S14 determines whether or not the external mode 41 should be replaced by another mode. When the external mode 41 should be replaced by another mode, the program exits from the step S15 and then the current execution cycle of the program segment ends. Otherwise, the program returns from the step S15 to the step S14 to continue the readout of the signals from the selected and used photosensor pixels in the imaging element array 13.

During the external mode 41 of operation, fixed weighting is implemented in accordance with user's request, and signals are read out from selected and used photosensor pixels in the imaging element array 13 according to a decided pattern (a decided pixel selection pattern or a decided signal readout pattern) independent of other devices and video conditions.

Figure 14:
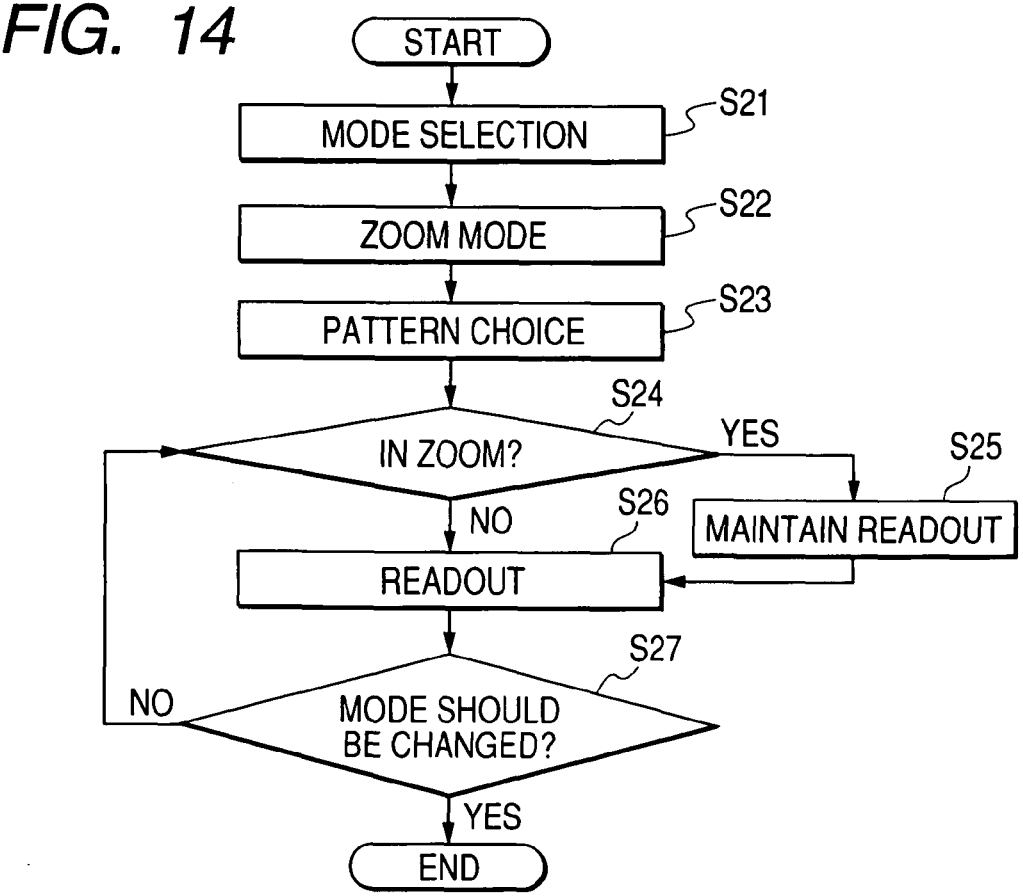
FIG. 14 is a flowchart of a segment of the control program which relates to a zoom mode of operation.

FIG. 14 is a flowchart of a segment (a subroutine) of the control program which relates to the zoom mode 42 of operation. As shown in FIG. 14, a first step S21 of the program segment waits for a mode selection request. When a mode selection request comes in, the program advances from the step S21 to a step S22.

The step S22 determines whether or not the mode selection request indicates that the zoom mode 42 should be selected. When the mode selection request indicates that the zoom mode 42 should be selected, the program advances from the step S22 to a step S23. Otherwise, the program exits from the step S22, and then the current execution cycle of the program segment ends.

The step S23 controls the pattern map 182 to choose, among the predetermined patterns (the predetermined pixel selection patterns or the predetermined signal readout patterns), one designed for the zoom mode 42. In this case, the mode selection request contains information about a zoom power. The step S23 extracts the information about the zoom power from the mode selection request. The step S23 controls the choice of one among the predetermined patterns in response to the zoom power. The pattern choice control is designed to provide the following setting conditions. As the zoom power increases, a pattern defining a smaller central high-resolution area is chosen. The chosen pattern defines low-resolution areas designed so that the pixel-thinning-out factor in one low-resolution area decreases as the place of the low-resolution area is closer to the edge of the frame. These setting conditions are applied to both the optical zoom and the electronic zoom. The step S23 labels the chosen pattern as the decided pattern.

A step S24 following the step S23 determines whether or not the operation of the imaging apparatus 10 is in the zoom mode 42. When the operation of the imaging apparatus 10 is in the zoom mode 42, the program advances from the step S24 to a step S25. Otherwise, the program advances from the step S24 to a step S26.

The step S25 controls the driving section 17 to continue the readout of signals from photosensor pixels in the imaging element array 13 which is also implemented at the immediately preceding moment. After the step S25, the program advances to the step S26.

The step S26 controls the driving section 17 in accordance with the decided pattern to implement the readout of signals from selected and used photosensor pixels in the imaging element array 13. The selected and used photosensor pixels are designated by the decided pattern. The number of the selected and used photosensor pixels is equal to or less than the prescribed value at which the outputting of a 1-frame picture signal with the prescribed frame rate is possible.

A step S27 subsequent to the step S26 determines whether or not the zoom mode 42 should be replaced by another mode. When the zoom mode 42 should be replaced by another mode, the program exits from the step S27 and then the current execution cycle of the program segment ends. Otherwise, the program returns from the step S27 to the step S24.

During the zoom mode 42 of operation, when the zoom power is relatively small, a preferable frame is such that an area "2" or an area "3" (see FIG. 5) corresponding to an intermediate-resolution area is relatively great. When the zoom power is relatively great, a focal depth is small and hence a preferable frame is such that an area "1" and an area "4" (see FIG. 5) corresponding to a high-resolution area and a low-resolution area are great.

Figure 15:
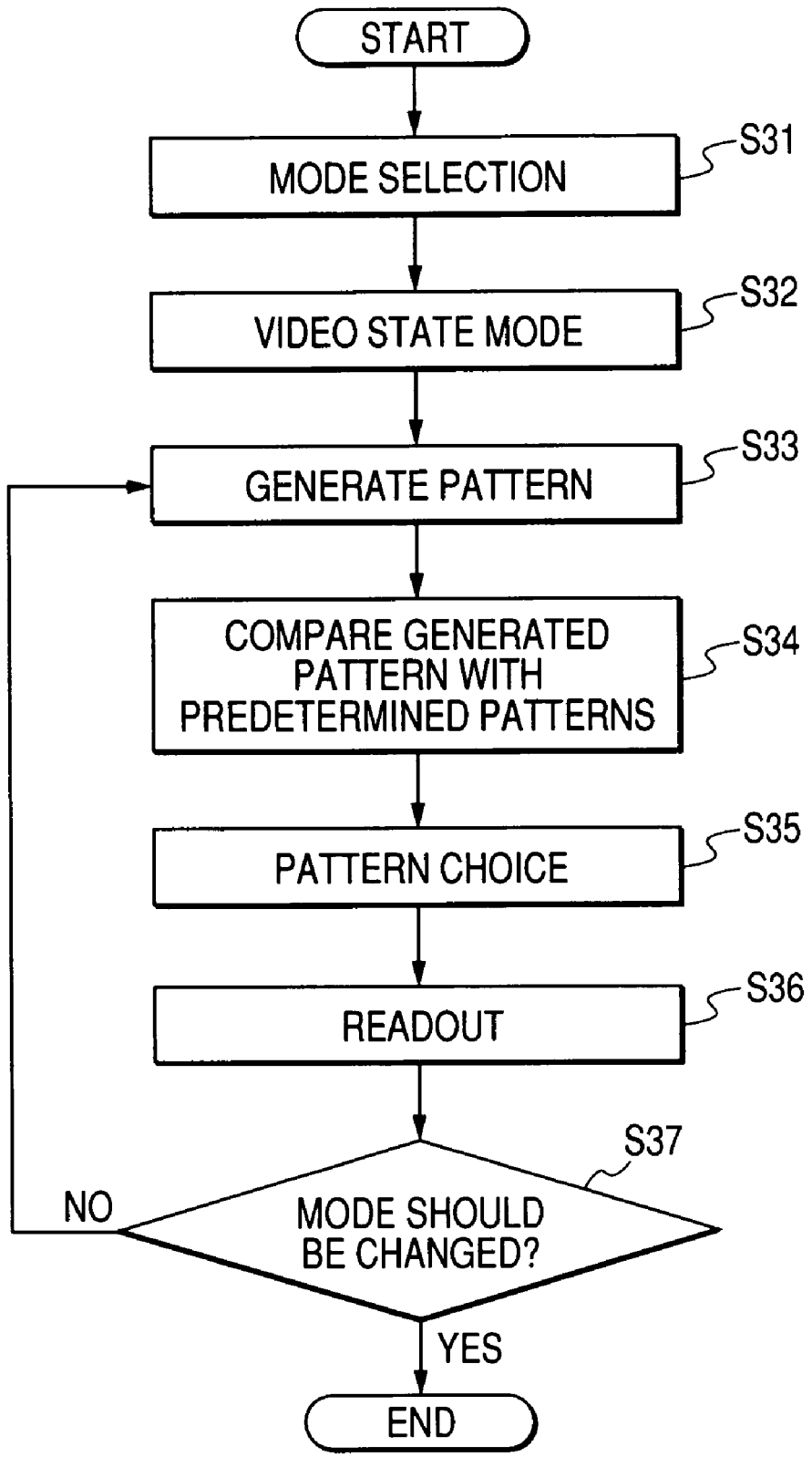
FIG. 15 is a flowchart of a segment of the control program which relates to a video state mode of operation.

FIG. 15 is a flowchart of a segment (a subroutine) of the control program which relates to the video state mode 43 of operation. As shown in FIG. 15, a first step S31 of the program segment waits for a mode selection request. When a mode selection request comes in, the program advances from the step S31 to a step S32.

The step S32 determines whether or not the mode selection request indicates that the video state mode 43 should be selected. When the mode selection request indicates that the video state mode 43 should be selected, the program advances from the step S32 to a step S33. Otherwise, the program exits from the step S32, and then the current execution cycle of the program segment ends.

The step S33 generates a basic pattern in response to the mode selection request and related conditions. Specifically, the step S33 determines which of the sports mode 46, the high-resolution mode 47, and the portrait mode 48 the mode selection request designates. When the mode selection request designates the sports mode 46, the step S33 accesses the EIS circuit 251 to receive the results of the detection of motion vectors of a subject which relate to a shake of the apparatus body (that is, a shake of the imaging element array 13). In this case, the step S33 generates a basic pattern in response to the received results of the detection of the motion vectors. When the mode selection request designates the high-resolution mode 47, the step S33 accesses the AF circuit 252 to receive the results of the detection of high-frequency signal components obtained at the time of auto focus light measurement. In this case, the step S33 generates a basic pattern in response to the received results of the detection of the high-frequency signal components. When the mode selection request designates the portrait mode 48, the step S33 accesses the face detection circuit 253 to receive the results of the detection of a human face. In this case, the step S33 generates a basic pattern in response to the received results of the detection of the human face.

A step S34 following the step S33 compares the basic pattern with the predetermined patterns in the pattern map 182.

A step S35 subsequent to the step S34 refers to the results of the comparison by the step S34, and searches the predetermined patterns in the pattern map 182 for one closest in weighting conditions to the basic pattern. Preferably, the step S35 searches the predetermined patterns in the pattern map 182 for one which is closest in weighting conditions to the basic pattern, and which defines a used-pixel-group number near the previously-mentioned reference number. The step S35 controls the pattern map 182 to choose the search-result pattern (the predetermined pattern closest to the basic pattern). The step S35 labels the chosen pattern as the decided pattern.

A step S36 following the step S35 controls the driving section 17 in accordance with the decided pattern to implement the readout of signals from selected and used photosensor pixels in the imaging element array 13. The selected and used photosensor pixels are designated by the decided pattern.

A step S37 subsequent to the step S36 determines whether or not the video state mode 43 should be replaced by another mode. When the external mode 41 should be replaced by another mode, the program exits from the step S37 and then the current execution cycle of the program segment ends.

On the other hand, when the external mode 41 should not be replaced by another mode, the step S37 controls the counter 183 to calculate the number of active pixel groups (selected and used pixel groups) in the imaging element array 13 which relate to 1-pixel-group corresponding segments of the picture signal outputted from the imaging element array 13 to the A/D converter 14. The step S37 receives, from the counter 183, information about the calculated active-pixel-group number. The step S37 determines whether or not the calculated active-pixel-group number exceeds the reference number, that is, the value at which the outputting of a 1-frame picture signal with the prescribed frame rate is possible. When the calculated active-pixel-group number exceeds the reference number, the step S37 generates a control signal for decreasing the size of a high-resolution area defined by the decided pattern and increasing the size of a low-resolution area defined by the decided pattern. Then, the program returns from the step S37 to the step S33. In this case, the step S33 responds to the control signal, and thereby decreases the size of a high-resolution area defined by the decided pattern and increases the size of a low-resolution area defined by the decided pattern to obtain a corrected pattern. The step S33 labels the corrected pattern as a generated basic pattern. On the other hand, when the calculated active-pixel-group number is equal to or less than the prescribed number, the step S37 does not generate the control signal. Then, the program returns from the step S37 to the step S33.

As previously mentioned, the sports mode 46 utilizes motion vectors of a subject which are detected by the EIS circuit 251. During the sports mode 46 of operation, the main controller 18 determines whether the range through which the subject is moving is greater than a prescribed threshold value. When the range through which the subject is moving is greater than the prescribed threshold value (that is, when the subject is moving fast), the main controller 18 chooses, among the predetermined patterns in the pattern map 182, one defining a wide central division-result area as corresponding to a high-resolution area and defining other division-result areas (peripheral division-result areas) as corresponding to low-resolution areas. In this case, the resolution in a peripheral division-result area decreases as the position of the peripheral division-result area moves from the center of the frame to an edge thereof. When the range through which the subject is moving is equal to or smaller than the prescribed threshold value (that is, when the subject is moving slowly), the main controller 18 chooses, among the predetermined patterns in the pattern map 182, one defining a narrow central division-result area as corresponding to a high-resolution area and defining other division-result areas (peripheral division-result areas) as corresponding to low-resolution areas. In this case, the resolution in a peripheral division-result area decreases as the position of the peripheral division-result area moves from the center of the frame to an edge thereof.

As previously mentioned, the EIS circuit 251 detects a shake of the apparatus body (that is, a shake of the imaging element array 13) as information about the subject. The main controller 18 refers to the detected shake of the apparatus body. Specifically, the main controller 18 determines whether or not the detected shake of the apparatus body is greater than a setting value. When the detected shake of the apparatus body is greater than the setting value, the main controller 18 chooses, among the predetermined patterns in the pattern map 182, one defining the whole of a frame as corresponding to a low-resolution area relating to a pixel-thinning-out factor of, for example, 1/2). When the detected shake of the apparatus body is equal to or smaller than the setting value, the main controller 18 chooses, among the predetermined patterns in the pattern map 182, one defining a central division-result area as corresponding to a high-resolution area and defining other division-result areas (peripheral division-result areas) as corresponding to low-resolution areas. In this case, the resolution in a peripheral division-result area decreases as the position of the peripheral division-result area moves from the center of the frame to an edge thereof.

As previously mentioned, the high-resolution mode 47 utilizes high-frequency signal components detected by the AF circuit 252 at the time of auto focus light measurement. In general, the size of an auto focus light measurement area is decided depending on whether or not high-frequency signal components detected by the AF circuit 252 are in a predetermined central zone (an initial central zone) in a frame. When the detected high-frequency signal components are in the central zone, the central zone is labeled as an auto focus light measurement area. On the other hand, when the detected high-frequency signal components are not in the central zone, the central zone is expanded from the predetermined size (the initial size). Then, a check is made as to whether or not the detected high-frequency signal components are in the expanded central zone. The size of the auto focus light measurement area is decided depending on the result of this check. The above actions are iterated until the detected high-frequency signal components come in the latest expanded central zone. The predetermined patterns in the pattern map 182 include ones accorded with the predetermined central zone and the expanded central zones respectively. Specifically, a predetermined pattern accorded with one central zone defines a central division-result area as coinciding with the central zone and corresponding to a high-resolution area, and defines other division-result areas (peripheral division-result areas) as corresponding to low-resolution areas. In this case, the resolution in a peripheral division-result area decreases as the position of the peripheral division-result area moves from the center of the frame to an edge thereof. The main controller 18 refers to information about the central zone in which the detected high-frequency signal components are. The main controller 18 chooses, among the predetermined patterns in the pattern map 182, one accorded with the central zone. The central zone for auto focus may be contracted. In this case, the main controller 18 implements a pattern choice similar to the above.

The predetermined patterns in the pattern map 182 decide the number of division-result areas in a frame, and the shape and resolution of each of the division-result areas. In other words, the number of division-result areas in a frame, and the shape and resolution of each of the division-result areas can vary from pattern to pattern. One can be chosen among the predetermined patterns in accordance with user's request. One optimum to a subject whose image should be captured may be chosen among the predetermined patterns. The drive signal for the imaging element array 13 is generated in response to the chosen pattern.

Preferably, the predetermined patterns in the pattern map 182 are equal in the number of selected and used photosensor pixels in the imaging element array 13 for every frame, that is, the number of photosensor pixels from which signals are read out for every frame. In this case, a 1-frame picture signal can be outputted from the imaging element array 13 at a prescribed drive frequency independent of which of the predetermined patterns is chosen. Thus, it is unnecessary to manage the number of selected and used photosensor pixels in the imaging element array 13 for every frame.

Alternatively, the predetermined patterns in the pattern map 182 may be different in the number of selected and used photosensor pixels in the imaging element array 13 for every frame. In this case, the number of selected and used photosensor pixels is calculated or estimated for the chosen pattern. When the calculated number of selected and used photosensor pixels exceeds the reference number, the chosen pattern is replaced by another of the predetermined patterns.

As previously mentioned, the imaging element array 13 has a matrix of photosensor pixels arranged in a horizontal direction and a vertical direction. The photo-electric conversion surface of the imaging element array 13 can be virtually divided into at least one high-resolution area and at least one low-resolution area. The driving section 17 drives the imaging element array 13 so that first pixel signals will be read out from all photosensor pixels in the high-resolution area and second pixel signals will be read out from only ones selected from photosensor pixels in the low-resolution area on a thinning-out basis. The interpolating section 21 implements interpolation responsive to the readout second pixel signals to generate third pixel signals. The picture forming section 23 combines the first pixel signals, the second pixel signals, and the third pixel signals to generate a 1-frame picture signal. The 1-frame picture signal may be replaced by a 1-field picture signal. When the high-resolution area is set into coincidence with a portion of interest in the focused image on the imaging element array 13, a high-resolution picture signal is obtained which represents the portion of interest in the focused image. On the other hand, a low-resolution picture signal is obtained which represents the other portion of the focused image. The pixel-thinning-out enables a 1-frame picture signal or a 1-field picture signal composed of the high-resolution picture signal and the low-resolution picture signal to be outputted from the imaging element array 13 at a prescribed rate.

Second Embodiment

A second embodiment of this invention is similar to the first embodiment thereof except for design changes mentioned hereafter. According to the second embodiment of this invention, the main controller 18 or the microcomputer 189 includes a memory providing a database listing a plurality of different tables providing different patterns (different pixel selection patterns or different signal readout patterns) respectively. Each of the different tables decides parameter conditions including a parameter condition as to whether or not the photo-electric conversion surface of the imaging element array 13 should be divided into different-resolution areas, a parameter condition as to the arrangement of the different-resolution areas, and a parameter condition about the ratio (the pixel-thinning-out factor or the weighting factor) between the number of selected and used photosensor pixels and the number of all photosensor pixels in the photo-electric conversion surface of the imaging element array 13 or each low-resolution area therein. The different tables are assigned to different database addresses given by different states of detected information including at least one of subject information and picture taking information. One is chosen among the different tables in accordance with the current state of the detected information. The imaging element array 13 is driven according to the pixel selection pattern provided by the chosen table.

As previously mentioned, the imaging element array 13 includes, for example, a CMOS image sensor having a matrix of 1600 photosensor pixels in a horizontal direction and 1200 photosensor pixels in a vertical direction.

Figure 16:
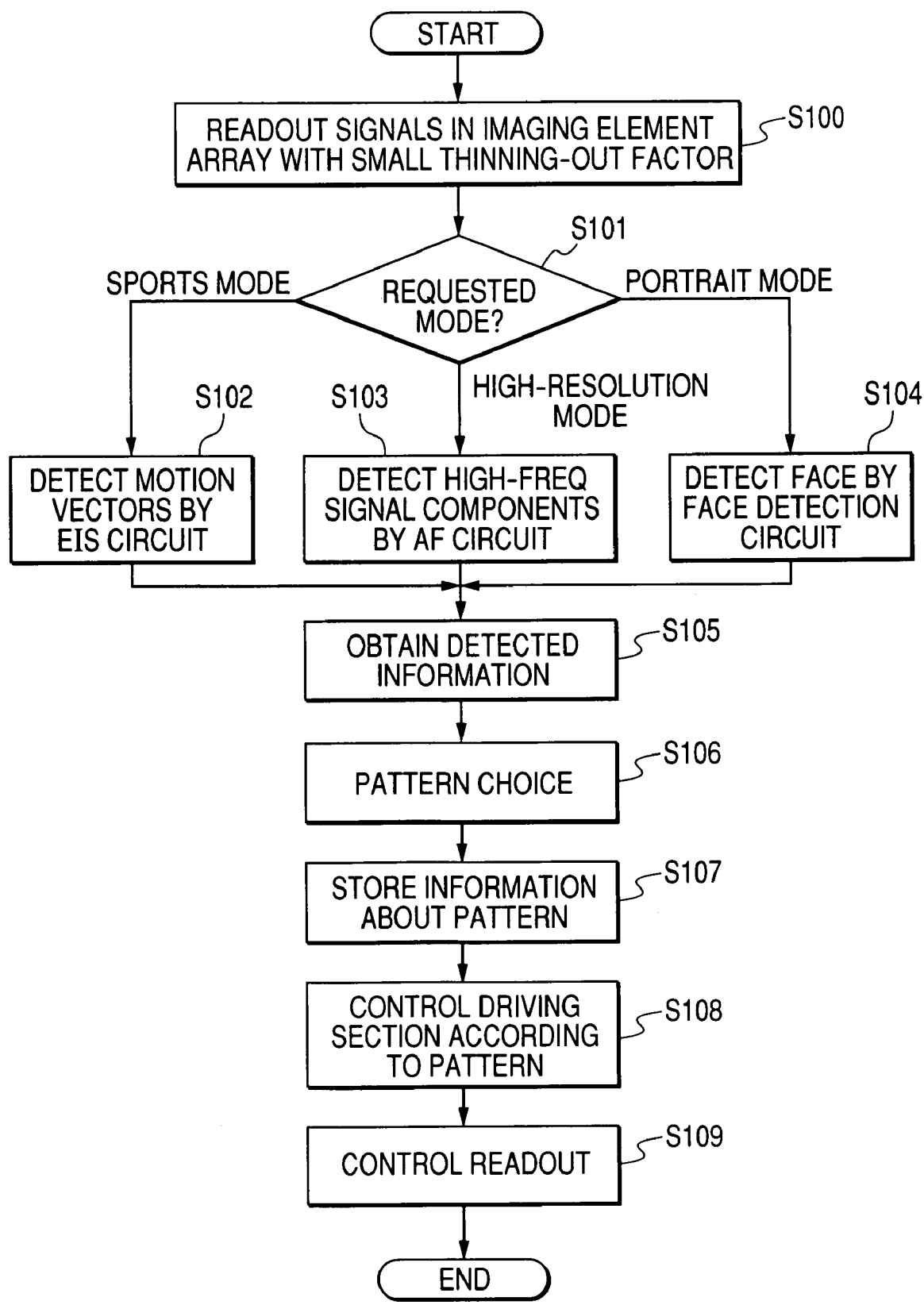
FIG. 16 is a flowchart of a segment of a computer program in a second embodiment of this invention.

FIG. 16 is a flowchart of a segment (a subroutine) of a computer program for the main controller 18 or the microcomputer 189. With reference to FIG. 16, a first step S100 of the program segment controls the driving section 17 to read out signals from only ones selected from all the photosensor pixels of the imaging element array 13 on a thinning-out basis with a predetermined small pixel-thinning-out factor. The pixel-thinning-out enables a 1-frame picture signal to be outputted from the imaging element array 13 in a time interval of, for example, 1/60 second while the imaging element array 13 is driven at a relatively low drive frequency (for example, 28.75 MHz).

A step S101 following the step S100 checks a mode selection request inputted by the user through the operation unit 19. The step S101 determines which of the sports mode 46, the high-resolution mode 47, and the portrait mode 48 the mode selection request designates. When the mode selection request designates the sports mode 46, the program advances from the step S101 to a step S102. When the mode selection request designates the high-resolution mode 47, the program advances from the step S101 to a step S103. When the mode selection request designates the portrait mode 48, the program advances from the step S101 to a step S104.

The step S102 elects the detection of motion vectors by the EIS circuit 251. After the step S102, the program advances to a step S105.

The step S103 elects the detection of high-frequency signal components by the AF circuit 252. After the step S103, the program advances to the step S105.

The step S104 elects the detection of a human face by the face detection circuit 253. After the step S104, the program advances to the step S105.

The step S105 accesses one of the EIS circuit 251, the AF circuit 252, and the face detection circuit 253, and activates the accessed circuit in accordance with the election by the immediately-preceding step (the step S102, the step S103, or the step S104). The step S105 receives, from the accessed circuit, information about the motion vectors detected by the EIS circuit 251, the high-frequency signal components detected by the AF circuit 252, or the human face detected by the face detection circuit 253. The step S105 labels the received information as detected information.

A step S106 subsequent to the step S105 searches the database for a table corresponding to the detected information given by the step S105. The search-result table provides a pixel selection pattern which indicates whether or not the photo-electric conversion surface of the imaging element array 13 should be divided into different-resolution areas, the arrangement of the different-resolution areas, and the ratio (the pixel-thinning-out factor or the weighting factor) between the number of selected and used photosensor pixels and the number of all photosensor pixels in the photo-electric conversion surface of the imaging element array 13 or each low-resolution area therein. The pattern defines at least one high-resolution area and a low-resolution area or areas in the photo-electric conversion surface of the imaging element array 13. The pattern designates, among all the photosensor pixels of the imaging element array 13, ones to be selected and used for the capture of the focused image.

A step S107 following the step S106 identifies a pixel selection pattern corresponding to the search-result table. The step S107 labels the identified pixel selection pattern as a decided pixel selection pattern. The step S107 stores information about the decided pixel selection pattern in a memory within the main controller 18 or the microcomputer 189.

A step S108 subsequent to the step S107 controls the driving section 17 in accordance with the decided pixel selection pattern. A step S109 following the step S108 controls the imaging element array 13 through the driving section 17 to implement the readout of signals from only ones selected from all the photosensor pixels of the imaging element array 13 according to the decided pixel selection pattern. After the step S109, the current execution cycle of the program segment ends.

As previously mentioned, the database lists the plurality of the different tables providing the different patterns (the different pixel selection patterns or the different signal readout patterns) respectively. One is chosen among the different tables. The table choice makes it possible that pixel signals are read out from all photosensor pixels in a high-resolution area in the photo-electric conversion surface of the imaging element array 13 to generate a high-resolution picture signal while pixel signals are read out from only ones selected from photosensor pixels in a low-resolution area therein on a thinning-out basis to generate a low-resolution picture signal. When the high-resolution area is set into coincidence with a portion of interest in the focused image on the imaging element array 13, a high-resolution picture signal is obtained which represents the portion of interest in the focused image. On the other hand, a low-resolution picture signal is obtained which represents the other portion of the focused image. The pixel-thinning-out enables a 1-frame picture signal or a 1-field picture signal composed of the high-resolution picture signal and the low-resolution picture signal to be outputted from the imaging element array 13 at a prescribed rate.

There may be two or more low-resolution areas in the photo-electric conversion surface of the imaging element array 13. In this case, the effective resolution provided by a low-resolution area varies or decreases as the place of the low-resolution area moves from the center of the photo-electric conversion surface of the imaging element array 13 to an edge thereof.

Third Embodiment

A third embodiment of this invention is similar to the second embodiment thereof except for design changes mentioned hereafter. The third embodiment of this invention relates especially to a case where the user requests the high-resolution mode 47.

Figure 17:
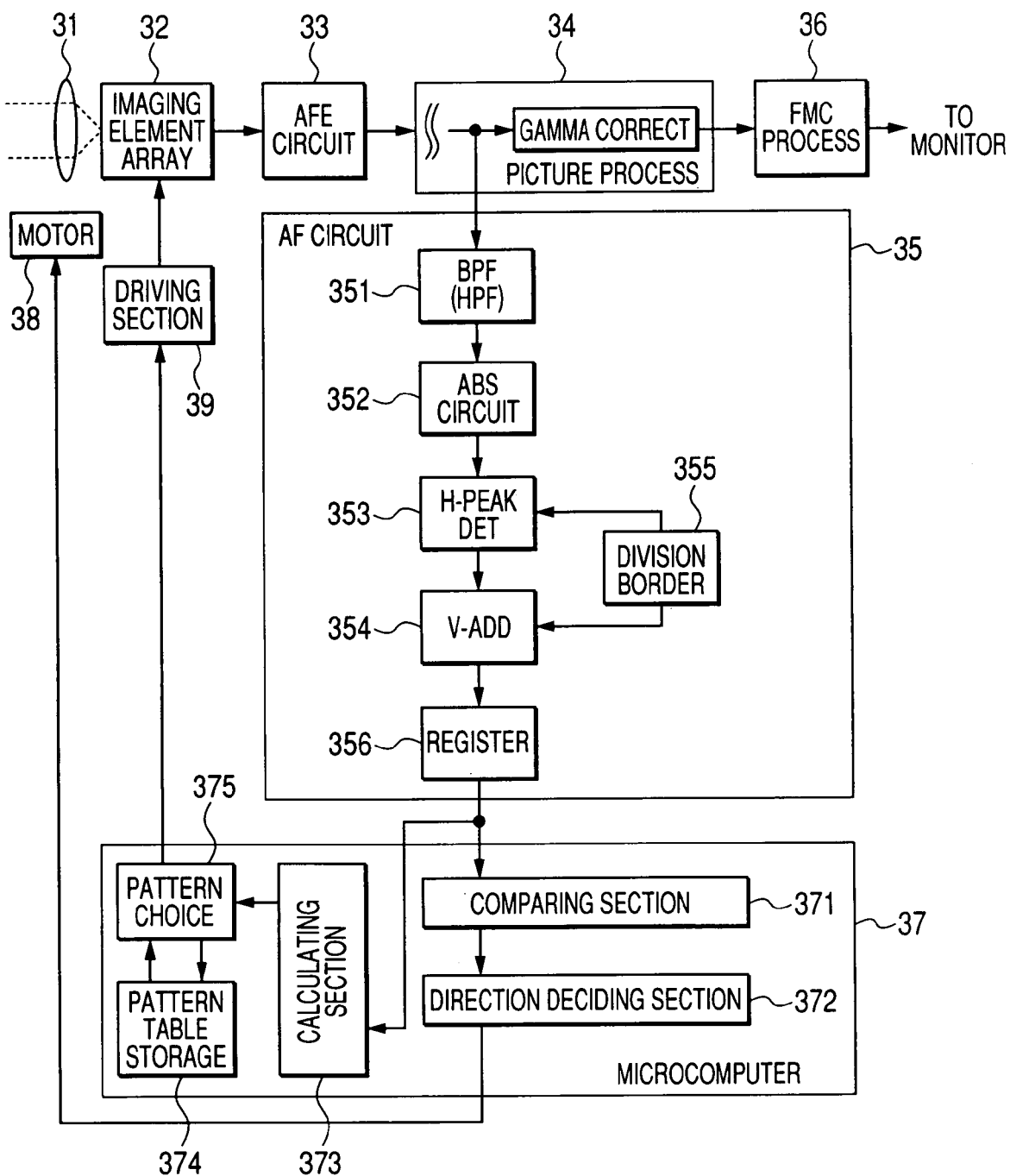
FIG. 17 is a diagram of an imaging apparatus according to a third embodiment of this invention.

FIG. 17 shows an imaging apparatus according to the third embodiment of this invention. As shown in FIG. 17, the imaging apparatus includes a lens 31, an imaging element array 32, an AFE (analog front end) circuit 33, a picture processing section 34, an FMC processing section 36, a microcomputer 37, a motor 38, and a driving section 39.

Preferably, the imaging element array 32 is of a high definition type. Further, the imaging element array 32 is of a randomly-accessible type. Specifically, the imaging element array 32 includes, for example, a CMOS image sensor having a matrix of 1600 photosensor pixels in a horizontal direction and 1200 photosensor pixels in a vertical direction.

The AF circuit 35 includes a band pass filter (BPF) or a high pass filter (HPF) 351, an ABS (absolute) circuit 352, a horizontal peak detecting section 353, a vertical adding section 354, a division-border inputting section 355, and a register 356.

The microcomputer 37 is programmed to function as a comparing section 371, a direction deciding section 372, a calculating section 373, a pattern-table storing section 374, and a TG-drive-pattern choosing section 375.

Light from a subject is focused by the lens 31 into an image of the subject on the photo-electric conversion surface of the imaging element array 32. The lens 31 can be moved by the motor 38. The focused image of the subject is changed into a corresponding electric signal by the imaging element array 32 through photo-electric conversion.

At an initial stage of operation of the imaging apparatus, the driving section 39 drives the imaging element array 32 to read out signals from only ones selected from all the photosensor pixels of the imaging element array 32 on a thinning-out basis with a predetermined small pixel-thinning-out factor. The pixel-thinning-out enables a 1-frame captured-image signal to be repetitively outputted from the imaging element array 32 at a frame rate of, for example, ⅙₀ second while the imaging element array 32 is activated by a drive signal from the driving section 39 which has a relatively low frequency (for example, 28.75 MHz).

The AFE circuit 33 receives the captured-image signal from the imaging element array 32. The AFE circuit 33 subjects the received captured-image signal to gain adjustment to obtain an adjusted captured-image signal. The picture processing section 34 receives the adjusted captured-image signal from the AFE circuit 33. The picture processing section 34 subjects the received captured-image signal to signal processing inclusive of gamma correction to obtain a processed captured-image signal. The FMC processing section 36 receives the processed captured-image signal from the picture processing section 34. The FMC processing section 36 processes the received captured-image signal to implement zoom such as enlargement or reduction with respect to the captured image. Thereby, the FMC processing section 36 generates zoom-result captured-image signal. The FMC processing section 36 outputs the zoom-result captured-image signal to a monitor or a display (not shown).

In the case where the high-resolution mode 47 is requested, the AF circuit 35 receives the captured-image signal from the picture processing section 34. The AF circuit 35 detects high-frequency components of the received captured-image signal.

Specifically, the BPF or the HPF 351 in the AF circuit 35 cuts off low-frequency components of the received captured-image signal and extracts components with prescribed frequencies from the received captured-image signal. The BPF or the HPF 351 outputs the extracted components with the respective prescribed frequencies in parallel.

The ABS circuit 352 in the AF circuit 35 receives, from the BPF or the HPF 351, the extracted components of the captured-image signal which have the prescribed frequencies respectively. The ABS circuit 352 folds back each of the received signal components at a constant level to obtain its absolute value. Thus, the ABS circuit 352 obtains the absolute values for the prescribed frequencies respectively.

The horizontal peak detecting section 353 in the AF circuit 35 receives, from the ABS circuit 352, absolute-value signals which are signals representing the obtained absolute values respectively. The horizontal peak detection section 353 receives division-border information (information about division borders) from the division-border inputting section 355. For each of the division borders, the horizontal peak detecting section 353 detects peaks of the respective absolute-value signals on a horizontal-line by horizontal-line basis. The detected peaks are referred to as horizontal peaks. The horizontal peak detecting section 353 detects the horizontal peaks for the prescribed frequencies respectively.

FIG. 18 shows an example of the division borders. In FIG. 18, one frame is divided into 15 equal-size rectangles arranged in 5 rows and 3 columns. The division borders mean the borders of the division-result rectangles. The number, shape, and arrangement of the division borders may differ from those in FIG. 18. The division borders are decided by the microcomputer 37, and are notified to the division-border inputting section 355 therefrom.

The vertical adding section 354 in the AF circuit 35 receives information about the horizontal peaks from the horizontal peak detecting section 353. The vertical adding section 354 receives the division-border information from the division-border inputting section 355. For each of the prescribed frequencies, the vertical adding section 354 adds the values of the horizontal peaks along a vertical direction on a division-border by division-border basis. Thus, the vertical adding section 354 obtains the vertical-addition results for the prescribed frequencies and for the division borders. The vertical adding section 354 stores signals representative of the obtained vertical-addition results into the register 356. The vertical-addition results represented by the signals in the register 356 are variable and updatable on a frame-by-frame basis. The vertical-addition results are also referred to as the variable quantities.

The microcomputer 37 receives information about the vertical-addition results (the variable quantities) from the register 356. The comparing section 371 provided by the microcomputer 37 compares the current vertical-addition results with the 1-frame-preceding vertical-addition results and the 2-frame-preceding vertical-addition results. The direction deciding section 372 refers to the results of the comparison by the comparing section 371, and thereby decides a direction of axial movement of the lens 31 in which the peak levels increase. The direction deciding section 372 controls the motor 38 to move the position of the lens 31 along the decided direction.

The calculating section 373 provided by the microcomputer 37 implements calculations for a pattern choice in response to the vertical-addition results. The pattern-table storing section 374 is provided by a memory within the microcomputer 37. The pattern-table storing section 374 stores a plurality of pixel-selection-pattern tables (signal-readout-pattern tables). The TG-drive-pattern choosing section 375 provided by the microcomputer 37 chooses one among the pixel-selection-pattern tables in the pattern-table storing section 374 in accordance with the results of the calculations by the calculating section 373. The TG-drive-pattern choosing section 375 notifies the chosen pixel-selection-pattern table to the driving section 39.

As previously mentioned, the microcomputer 37 compares the current vertical-addition results with the 1-frame-preceding vertical-addition results and the 2-frame-preceding vertical-addition results. The results of the comparison are utilized for the position control of the lens 31. The vertical-addition results obtained by the AF circuit 35 are responsive to the detected prescribed-frequency components of the captured-image signal. The microcomputer 37 utilizes the vertical-addition results as a parameter for choosing a pixel-selection-pattern table. Furthermore, the microcomputer 37 utilizes the vertical-addition results to decide a starting point of a high-resolution area in which signals are read out from all photosensor pixels.

The TG-drive-pattern choosing section 375 controls the driving section 39 in response to the chosen pixel-selection-pattern table. Thus, the driving section 39 generates a drive signal for the imaging element array 32 in accordance with the chosen pixel-selection-pattern table. The driving section 39 outputs the generated drive signal to the imaging element array 32. Therefore, the imaging element array is driven and controlled in accordance with the chosen pixel-selection-pattern table. Used ones (active ones) are selected from all the photosensor pixels in the imaging element array 32 according to the chosen pixel-selection-pattern table, and signals are read out from only the selected photosensor pixels.

FIG. 19 shows an example of conditions of video data pieces corresponding to the respective division-result rectangles in FIG. 18. The video data pieces mean portions of the 1-frame captured-image signal. FIG. 20 shows an example of the values of the variable quantities represented by the signals in the register 356 for the respective division-result rectangles in the case where the video data pieces corresponding to the respective division-result rectangles are in the conditions of FIG. 19.

The calculating section 373 finds the maximum one among the variable quantities. In FIG. 19, the maximum variable quantity is "200". The calculating section 373 normalizes the maximum variable quantity to "1.00", and calculates the related normalization coefficient. When the before-normalization maximum variable quantity is "200", the normalization coefficient is equal to "1/200". The calculating section 373 multiplies the variable quantities by the normalization factor to obtain the after-normalization variable quantities. FIG. 21 shows an example of the values of the after-normalization variable quantities for the respective division-result rectangles in the case where the values of the before-normalization variable quantities are equal to those in FIG. 20.

The calculating section 373 has a table of pixel selection types and pixel selection rates corresponding to the respective pixel selection types. The pixel selection types include a 4/4 type, a 4/8 type, a 4/16 type, a 4/32 type, a 4/64 type, and a 4/128 type. The 4/4 type is designed so that signals will be read out from 4 photosensor pixels among every 4 photosensor pixels (signals will be read out from all photosensor pixels). The 4/4 type corresponds to a pixel selection rate of 1.00. The 4/8 type is designed so that signals will be read out from only 4 photosensor pixels among every 8 photosensor pixels. The 4/8 type corresponds to a pixel selection rate of 0.50. The 4/16 type is designed so that signals will be read out from only 4 photosensor pixels among every 16 photosensor pixels. The 4/16 type corresponds to a pixel selection rate of 0.25. The 4/32 type is designed so that signals will be read out from only 4 photosensor pixels among every 32 photosensor pixels. The 4/32 type corresponds to a pixel selection rate of 0.125. The 4/64 type is designed so that signals will be read out from only 4 photosensor pixels among every 64 photosensor pixels. The 4/64 type corresponds to a pixel selection rate of 0.0625. The 4/128 type is designed so that signals will be read out from only 4 photosensor pixels among every 128 photosensor pixels. The 4/128 type corresponds to a pixel selection rate of 0.03125.

The calculating section 373 regards the pixel selection rates in the table as parameters corresponding to after-normalization variable quantities. Firstly, the calculating section 373 searches the table for a pixel selection rate equal or close to the greatest one among the after-normalization variable quantities. The calculating section 373 chooses one among the pixel selection types in the table which corresponds to the search-result pixel selection rate. In this way, the calculating section 373 chooses the pixel selection type corresponding to the greatest after-normalization variable quantity. Similarly, the calculating section 373 chooses a pixel selection type corresponding to each of the second greatest and later ones of the after-normalization variable quantities. As a result, the calculating section 373 obtains a set of the chosen pixel selection types for the respective after-normalization variable quantities, that is, for the respective division-result rectangles. The obtained set of the chosen pixel selection types is referred to as the pattern model.

When all the after-normalization variable quantities are equal, the chosen pixel selection type is adjusted so that the number of selected and used photosensor pixels for every frame will be equal to a predetermined constant value and thus uniform weighting will be performed.

Figure 22:
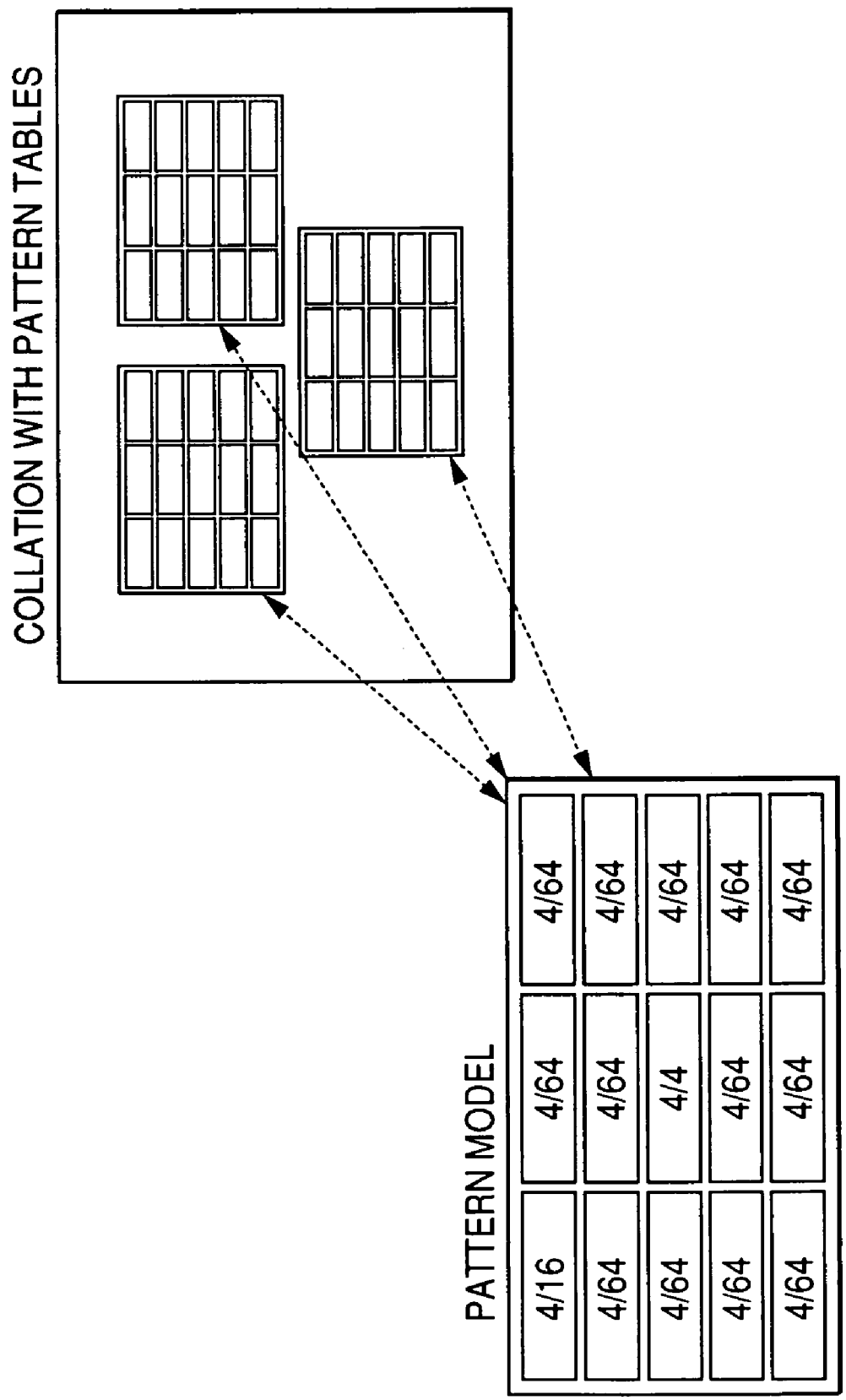
FIG. 22 is a diagram of a set of chosen pixel selection types for the respective division-result rectangles and collation with pixel-selection-pattern tables (signal-readout-pattern tables).

In the case where the after-normalization variable quantities take the values of FIG. 21, the greatest one there among is equal to "1.00". Accordingly, the calculating section 373 chooses the 4/4 type among the pixel selection types in the table which corresponds to a pixel selection rate of 1.00 equal to the greatest after-normalization variable quantity (=1.00). Thus, the calculating section 373 chooses the 4/4 type corresponding to the greatest after-normalization variable quantity (=1.00). The second greatest after-normalization variable quantity is equal to "0.25". Accordingly, the calculating section 373 chooses the 4/16 type among the pixel selection types in the table which corresponds to a pixel selection rate of 0.25 equal to the second greatest after-normalization variable quantity (=0.25). Thus, the calculating section 373 chooses the 4/16 type corresponding to the second greatest after-normalization variable quantity (=0.25). The third greatest after-normalization variable quantities are equal to "0.05". Accordingly, the calculating section 373 chooses the 4/64 type among the pixel selection types in the table which corresponds to a pixel selection rate of 0.0625 close to the third greatest after-normalization variable quantities (=0.05). Thus, the calculating section 373 chooses the 4/64 type corresponding to the third greatest after-normalization variable quantities (=0.05). As a result, the calculating section 373 obtains a set of the chosen pixel selection types for the respective division-result rectangles. FIG. 22 shows the obtained set of the chosen pixel selection types for the respective division-result rectangles. The obtained set of the chosen pixel selection types is called the pattern model.

With reference to FIG. 22, the TG-drive-pattern choosing section 375 collates the pattern model obtained by the calculating section 373 with the pixel-selection-pattern tables in the pattern-table storing section 374. Thereby, the TG-drive-pattern choosing section 375 chooses, among the pixel-selection-pattern tables, one closest in weighting to the pattern model. FIGS. 23, 24, and 25 show examples of three among the pixel-selection-pattern tables in the pattern-table storing section 374. Each of the pixel-selection-pattern tables has a set of pixel selection types assigned to the respective division-result rectangles.

The TG-drive-pattern choosing section 375 compares the pixel selection types in positions within the pattern model with those in the corresponding positions within the pixel-selection-pattern tables. Specifically, the TG-drive-pattern choosing section 375 compares the pixel selection type in the pattern model which relates to the greatest pixel selection rate with the positionally-corresponding pixel selection types in the pixel-selection-pattern tables. Thereby, the TG-drive-pattern choosing section 375 finds, among the pixel-selection-pattern tables, ones having pixel selection types equal or closest to the foregoing pixel selection type in the pattern model. The TG-drive-pattern choosing section 375 labels the found pixel-selection-pattern tables as the candidate pixel-selection pattern tables. In the case where the pattern model is that of FIG. 22 and the pixel-selection-pattern tables are those of FIGS. 23, 24, and 25, the TG-drive-pattern choosing section 375 sets the pixel-selection-pattern tables of FIGS. 23 and 24 as candidate ones. Subsequently, the TG-drive-pattern choosing section 375 compares the pixel selection type in the pattern model which relates to the second greatest pixel selection rate with the positionally-corresponding pixel selection types in the candidate pixel-selection-pattern tables. Thereby, the TG-drive-pattern choosing section 375 finds, among the candidate pixel-selection-pattern tables, one having a pixel selection type equal or closest to the foregoing pixel selection type in the pattern model. The TG-drive-pattern choosing section 375 labels the found pixel-selection-pattern table as a chosen pixel-selection-pattern table (a decided pixel-selection-pattern table). In the case where the pattern model is that of FIG. 22 and the candidate pixel-selection-pattern tables are those of FIGS. 23 and 24, the TG-drive-pattern choosing section 375 finally chooses the pixel-selection-pattern table of FIG. 23.

The TG-drive-pattern choosing section 375 notifies the chosen pixel-selection-pattern table to the driving section 39. The driving section 39 drives the imaging element array 32 in response to the chosen pixel-selection-pattern table. Thus, signals are read out from ones selected among the photosensor pixels of the imaging element array 32 according to the chosen pixel-selection-pattern table (for example, the pixel-selection-pattern table of FIG. 23). As understood from the above description, optimum one is chosen among the pixel-selection-pattern tables in the pattern-table storing section 374 in response to the variable quantities for the respective division-result rectangles which are given by the AF circuit 35. Thereby, it is possible to easily implement the weighted readout of signals from photosensor pixels in the imaging element array 32.

Figure 26:
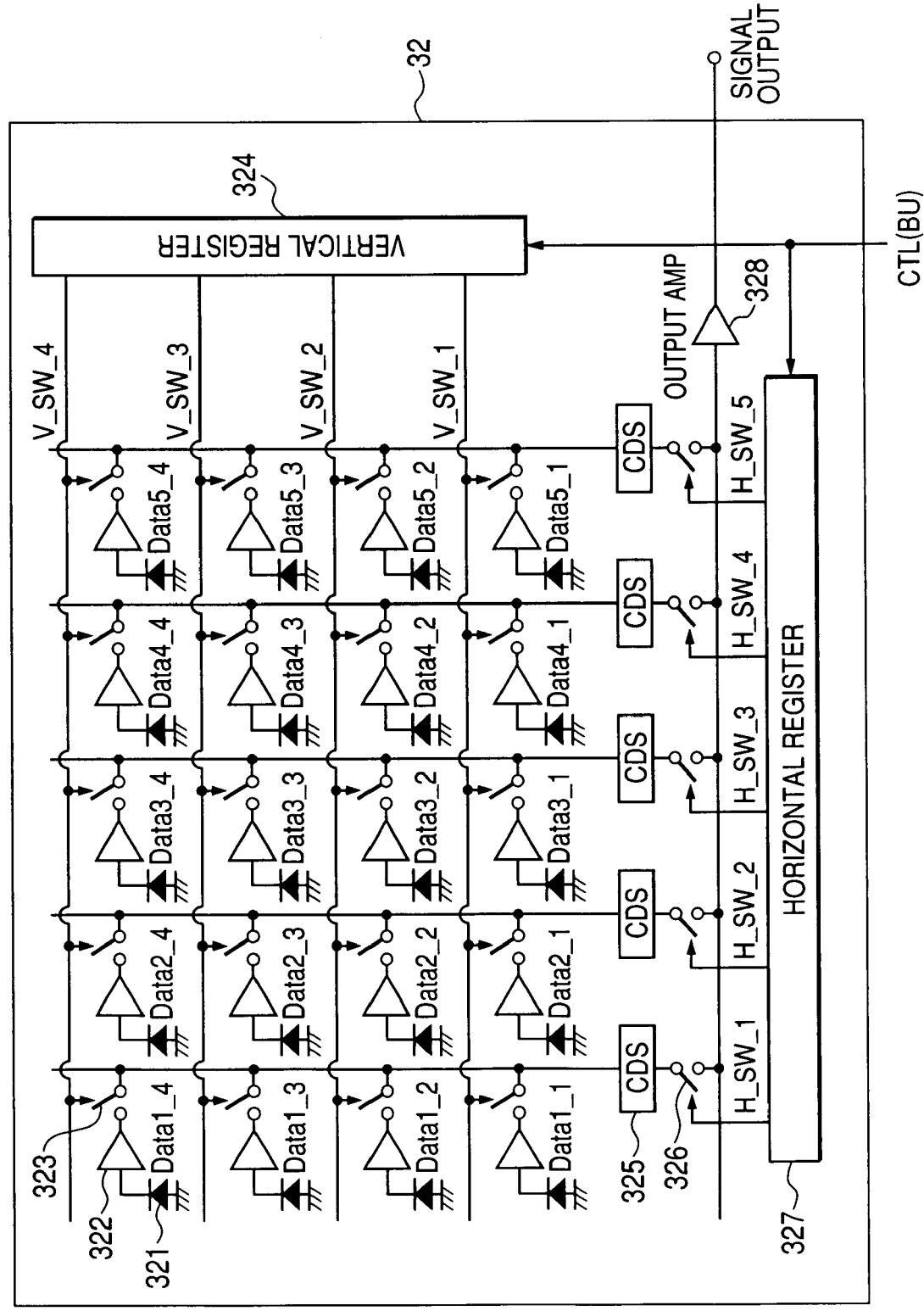
FIG. 26 is a diagram of an imaging element array in FIG. 17.

FIG. 26 shows an example of the structure of the imaging element array 32. With reference to FIG. 26, each photosensor pixel in the imaging element array 32 is composed of a photodiode 321, a buffer amplifier 322, and a V switch 323. The photodiode 321 changes incident light into charges through photo-electric conversion. The buffer amplifier 322 temporarily stores the charges generated by the photodiode 321, and produces and outputs a voltage signal in accordance with the stored charges. The V switch 323 selectively allows and blocks the transfer of the output signal from the buffer amplifier 322 to a vertical-direction output line. The imaging element array 32 includes, for example, a CMOS image sensor having a matrix of photosensor pixels arranged in rows and columns. It should be noted that FIG. 26 shows only 20 photosensor pixels (4-row by 5-column photosensor pixels) among all the photosensor pixels in the imaging element array 32.

The V switches 323 in the photosensor pixels in each of the rows are simultaneously changed between ON states and OFF states by a V switch selection signal (V_SW_1, V_SW_2, V_SW_3, or V_SW_4) fed from a vertical register 324. The rows are activated sequentially in the order from the highest row to the lowest row to successively change the related V switches 323 to their ON states. The V switches 323 in the photosensor pixels in each of the columns are connected to a correlated double sampling (CDS) circuit 325 via a vertical output line, and the CDS circuit 325 leads to an H switch 326.

The H switches 326 are provided for the rows, respectively. Each of the H switches 326 is changed between an ON state and an OFF state by an H switch selection signal (H_SW_1, H_SW_2, H_SW_3, H_SW_4, or H_SW_5) fed from a horizontal register 327. The H switches 326 are sequentially changed to their ON states along, for example, a direction from the leftmost H switch 326 to the rightmost H switch 326. The H switches 326 are connected in common to an output amplifier 328 via a signal line. One is selected from the photosensor pixels of the imaging element array 32 in response to the V switch selection signals (V_SW_1, V_SW_2, V_SW_3, and V_SW_4) and the H switch selection signals (H_SW_1, H_SW_2, H_SW_3, H_SW_4, and H_SW_5). A signal generated by the selected photosensor pixel is transmitted to the output amplifier 328 before being amplified by the output amplifier 328 and being outputted therefrom to an external device as a 1-pixel-corresponding segment of a captured-image signal.

Figure 27:
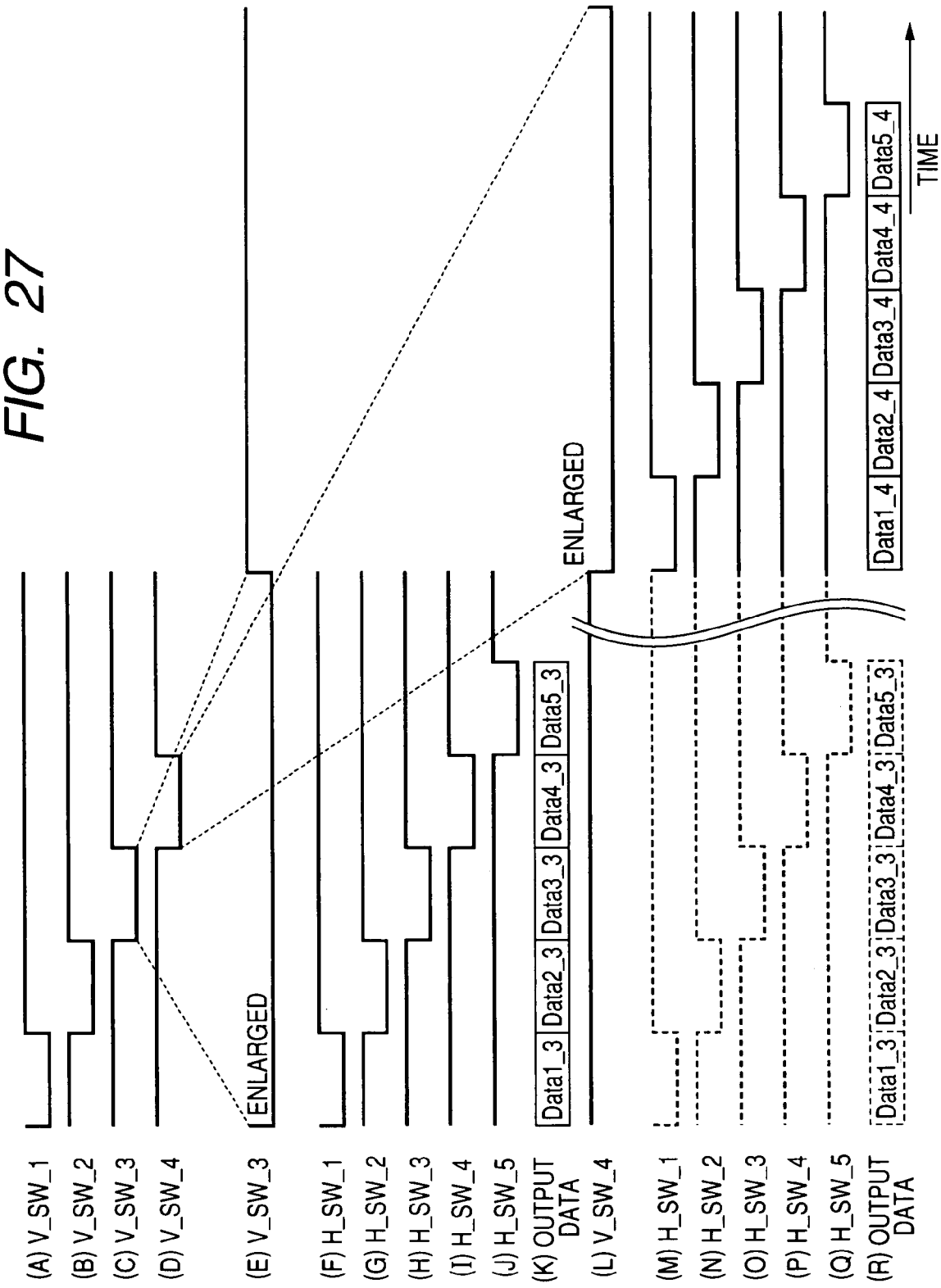
FIG. 27 is a time-domain diagram showing the waveforms of switch selection signals and conditions of output data which occur while signals are read out from all photosensor pixels of the imaging element array in FIG. 26.

During the readout of signals from all the photosensor pixels of the imaging element array 32, the V switch selection signals V_SW_1, V_SW_2, V_SW_3, and V_SW_4, and the H switch selection signals H_SW_1, H_SW_2, H_SW_3, H_SW_4, and H_SW_5 take waveforms shown in FIG. 27. In this case, the V switch selection signals V_SW_1, V_SW_2, V_SW_3, and V_SW_4 sequentially assume their low-level states for equal time intervals. Only when each of the V switch selection signals V_SW_1, V_SW_2, V_SW_3, and V_SW_4 is in its low-level state, all the V switches 323 in the related row take their ON states. While each of the V switch selection signals V_SW$_1$, V_SW_2, V_SW_3, and V_SW_4 remains in its low-level state, the H switch selection signals H_SW_1, H_SW_2, H_SW_3, H_SW_4, and H_SW_5 sequentially assume their low-level states for equal time intervals. Only when each of the H switch selection signals H_SW_1, H_SW_2, H_SW_3, H_SW_4, and H_SW_5 is in its low-level state, the related H switch 323 takes its ON state. Therefore, during the scanning of each row for which the related V switch selection signal remains in its low-level state so that all the V switches 323 in the row remain in their ON states, the photosensor pixels in the row are sequentially selected by the H switch selection signals and hence signals generated by the photosensor pixels in the row are sequentially outputted from the imaging element array 32.

Figure 28:
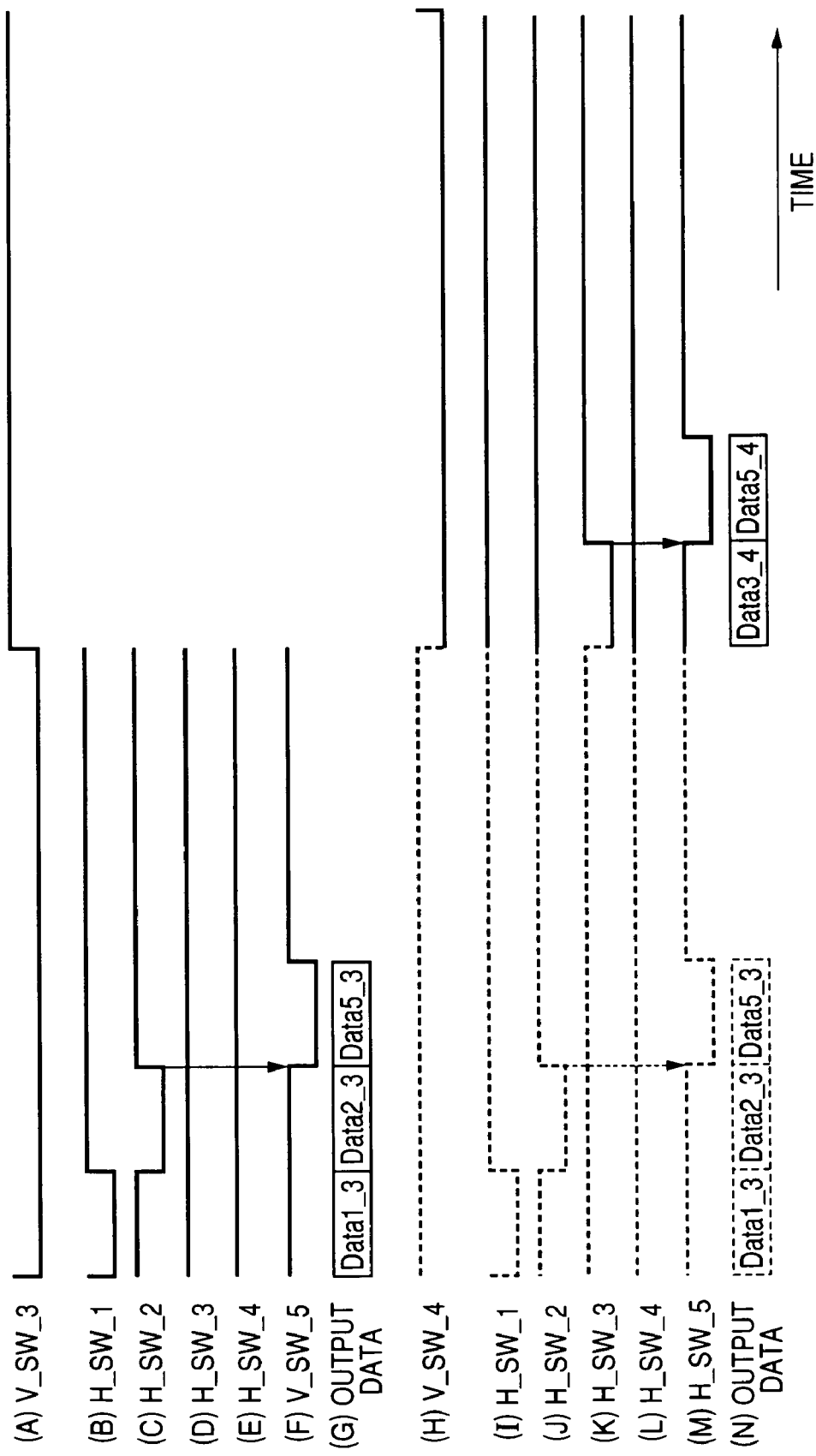
FIG. 28 is a time-domain diagram showing the waveforms of switch selection signals and conditions of output data which occur while signals are read out from only used ones selected among the photosensor pixels of the imaging element array in FIG. 26.

During an example of the weighted readout of signals from photosensor pixels in the imaging element array 32, the V switch selection signals V_SW_3 and V_SW_4, and the H switch selection signals H_SW_1, H_SW_2, H_SW_3, H_SW_4, and H_SW_5 take waveforms shown in FIG. 28. In this case, the V switch selection signals V_SW_3 and V_SW_4 sequentially assume their low-level states for equal time intervals. While the V switch selection signal V_SW_3 remains in its low-level state, the H switch selection signals H_SW_1, H_SW_2, and H_SW_5 sequentially assume their low-level states for equal time intervals and the H switch selection signals H_SW_3 and H_SW_4 continue to be in their high-level states. Therefore, in the row activated by the V switch selection signal V_SW_3, only the photosensor pixels related to the H switch selection signals H_SW_1, H_SW_2, and H_SW_5 are sequentially selected. Thus, only signals generated by the selected photosensor pixels in the activated row are sequentially outputted from the imaging element array 32. Immediately after the H switch selection signal H_SW_2 returns to its high-level state, the H switch selection signal H_SW_5 changes to its low-level state. While the V switch selection signal V_SW_4 remains in its low-level state, the H switch selection signals H_SW_3 and H_SW_5 sequentially assume their low-level states for equal time intervals and the H switch selection signals H_SW_1, H_SW_2, and H_SW_4 continue to be in their high-level states. Therefore, in the row activated by the V switch selection signal V_SW_4, only the photosensor pixels related to the H switch selection signals H_SW_3 and H_SW_5 are sequentially selected. Thus, only signals generated by the selected photosensor pixels in the activated row are sequentially outputted from the imaging element array 32. Immediately after the H switch selection signal H_SW_3 returns to its high-level state, the H switch selection signal H_SW_5 changes to its low-level state.

The vertical register 324 generates the V switch selection signals (V_SW_1, V_SW_2, V_SW_3, and V_SW_4) in response to a first control signal. The horizontal register 327 generates the H switch selection signals (H_SW_1, H_SW_2, H_SW_3, H_SW_4, and H_SW_5) in response to a second control signal. The first and second control signals are formed by the drive signal fed from the driving section 39. The drive signal reflects the chosen pixel-selection-pattern table provided by the microcomputer 37. Thus, the change of each of the V switch selection signals (V_SW_1, V_SW_2, V_SW_3, and V_SW_4) and the H switch selection signals (H_SW_1, H_SW_2, H_SW_3, H_SW_4, and H_SW_5) is controlled in accordance with the chosen pixel-selection-pattern table.

It is possible to dispense with a mechanical shutter. Preferably, the number of selected and used photosensor pixels from which signals are read out is constant. In this case, the frequency of the drive of the imaging element array 32 can be fixed.

Fourth Embodiment

A fourth embodiment of this invention is similar to the second embodiment thereof except for design changes mentioned hereafter. The fourth embodiment of this invention relates especially to a case where the user requests the sports mode 46.

Figure 29:
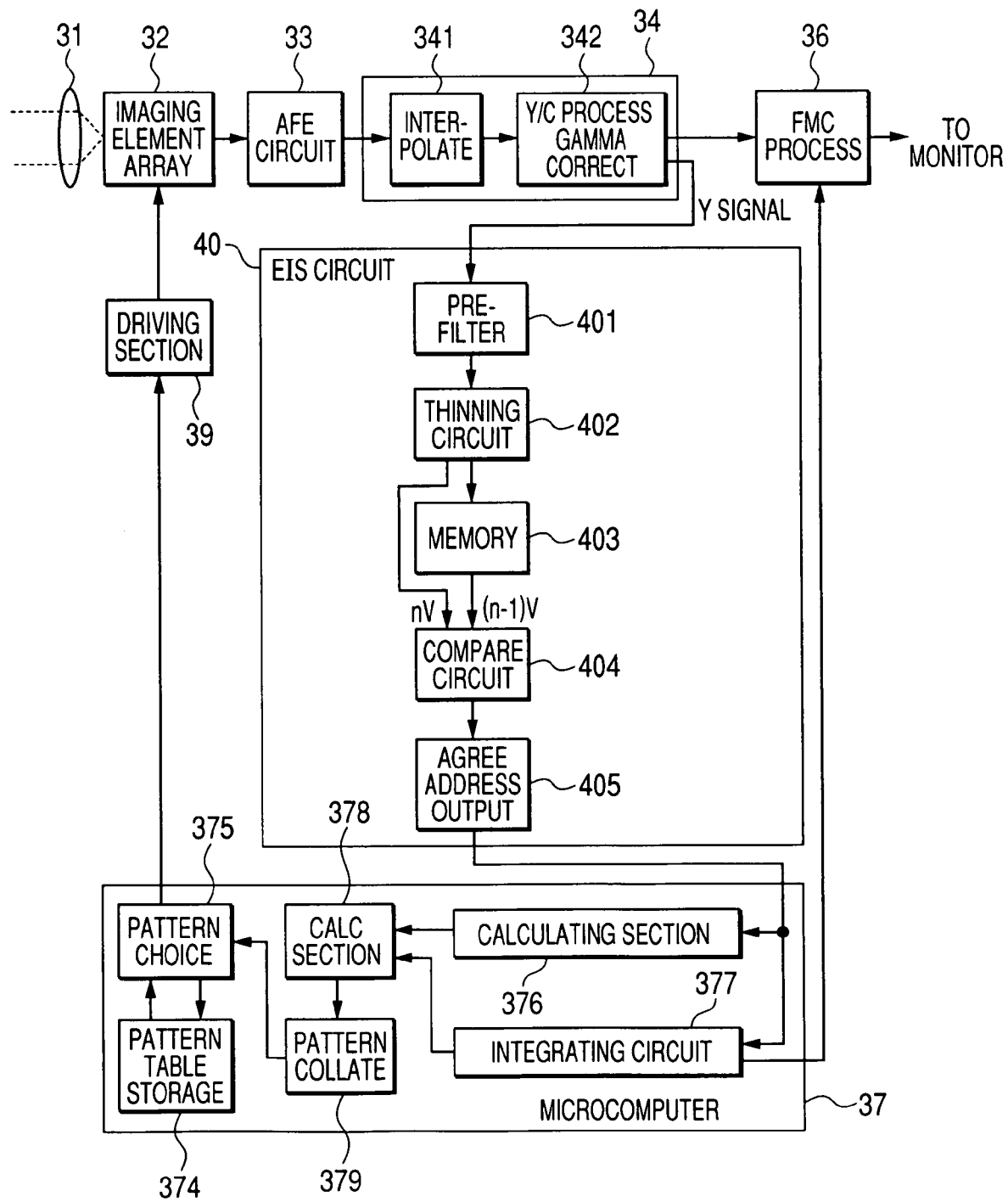
FIG. 29 is a diagram of an imaging apparatus according to a fourth embodiment of this invention.

FIG. 29 shows an imaging apparatus according to the fourth embodiment of this invention. The imaging apparatus in FIG. 29 is similar to that in FIG. 17 except for design changes mentioned hereafter.

The imaging apparatus of FIG. 29 includes an EIS circuit 40. The EIS circuit 40 has a pre-filter 401, a thinning circuit 402, a representative-point memory 403, a comparing circuit 404, and an agreement-address outputting section 405.

In the imaging apparatus of FIG. 29, the picture processing section 34 has an interpolating circuit 341 and a Y/C processing and gamma processing section 342. The microcomputer 37 is programmed to function as the pattern-table storing section 374, the TG-drive-pattern choosing section 375, a first calculating section 376, an integrating circuit 377, a second calculating section 378, and a pattern collating section 379.

The Y/C processing and gamma processing section 342 generates a luminance signal Y. The Y/C processing and gamma processing section 342 feeds the generated luminance signal Y to the EIS circuit 40.

The pre-filter 401 in the EIS circuit 40 receives the luminance signal Y. The pre-filter 401 includes a band pass filter (BPF). The pre-filter 401 selects prescribed-frequency components from the received luminance signal Y to generate a filtered luminance signal Y.

The thinning circuit 402 receives the filtered luminance signal Y from the pre-filter 401. The thinning circuit 402 decimates the filtered luminance signal Y to generate a decimated luminance signal Y. The thinning circuit 402 is provided with information about the division borders (see FIG. 18) which define, for example, 15 equal-size division-result rectangles arranged in 5 rows and 3 columns over one frame. There are a prescribed number of predetermined representative points in each of the division-result rectangles. The thinning circuit 402 is provided with information about the representative points. The thinning circuit 402 extracts pieces from the filtered luminance signal Y (the filtered luminance data Y) which correspond to the representative points. The extracted data pieces constitute the decimated luminance signal Y. The extracted data pieces are referred to as the representative-point data pieces. The thinning circuit 402 stores the extracted data pieces (the representative-point data pieces) into the representative-point memory 403.

The representative points in each of the division-result rectangles are spaced at equal intervals. The number of the representative points in each of the division-result rectangles is equal to, for example, 48. In this example, the 48 representative points are preferably arranged in 8 columns by 6 rows.

The comparing circuit 404 receives, from the thinning circuit 402, the representative-point data pieces which occur during a vertical scanning period nV. The comparing circuit 404 reads, from the representative-point memory 403, the representative-point data pieces which occur during a vertical scanning period (n−1)V immediately preceding the vertical scanning period nV. The comparing circuit 404 compares the representative-point data pieces from the thinning circuit 402 and those from the representative-point memory 403.

The agreement-address outputting section 405 receives the results of the comparison by the comparing circuit 404. The agreement-address outputting section 405 obtains motion-vector information from the comparison results. The motion-vector information indicates the quantities of motion of luminance information pieces, that is, which of the representative points the luminance information pieces start from and which of the representative points the luminance information pieces end at. The motion quantities have X-direction (horizontal-direction) components and Y-direction (vertical-direction) components. Furthermore, the motion-vector information indicate the directions of motion of the luminance information pieces. The agreement-address outputting section 405 feeds the motion-vector information to the microcomputer 37.

Specifically, for each of the representative points in each division-result rectangle, the comparing circuit 404 detects a variation in value between a data piece (a luminance information piece) for the vertical scanning period nV and that for the vertical scanning period (n−1)V. For the representative points in each division-result rectangle, the agreement-address outputting section 405 calculates the values and directions of vectors of motion of the luminance information pieces from the variations detected by the comparing circuit 404. The agreement-address outputting section 405 generates the motion-vector information which indicates the calculated values and directions of the motion vectors.

Figure 30:
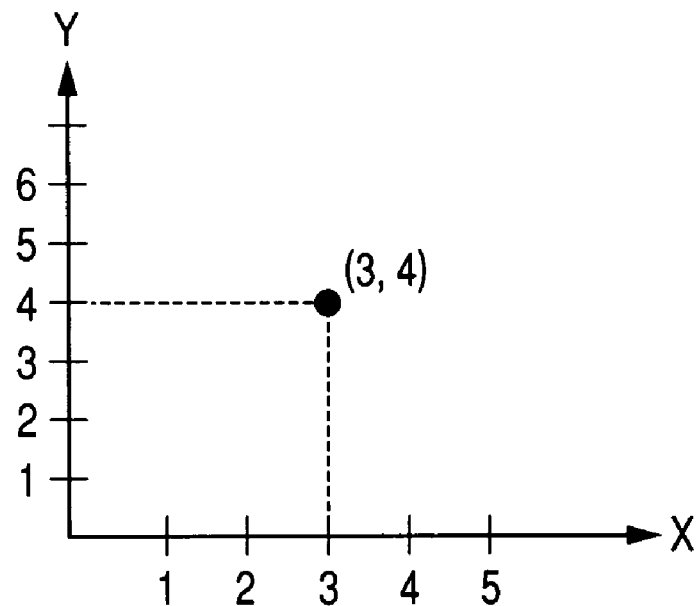
FIG. 30 is a diagram showing a luminance information piece corresponding to a representative point at coordinates of (3, 4) for a first vertical scanning period.
Figure 31:
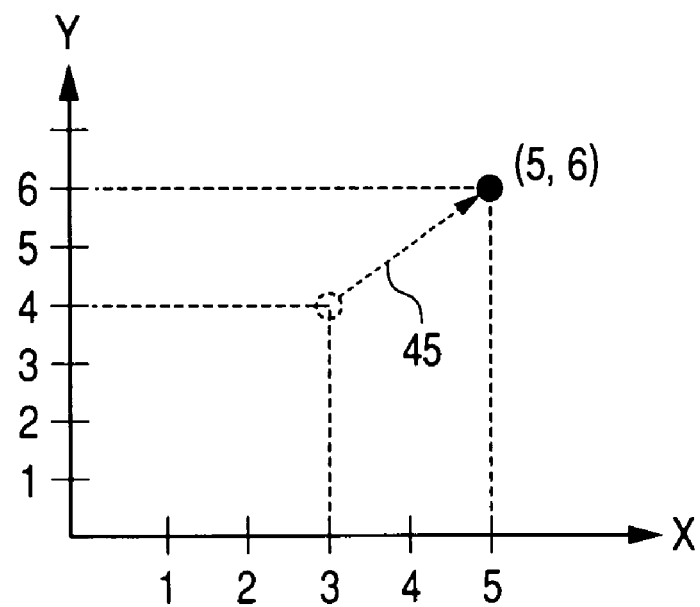
FIG. 31 is a diagram showing the luminance information piece corresponding to a representative point at coordinates of (5, 6) for a second vertical scanning period immediately after the first vertical scanning period of FIG. 30, and a related motion vector.

With reference to FIG. 30, there is a luminance information piece corresponding to a representative point at coordinates of (3, 4) for the vertical scanning period (n−1)V. With reference to FIG. 31, the luminance information piece corresponds to a representative point at coordinates of (5, 6) for the vertical scanning period nV. In this case, the luminance information piece moves from the representative point (3, 4) to the representative point (5, 6), and there occurs a related motion vector 45 between the two representative points. Accordingly, the direction of the related motion vector 45 which is calculated by the agreement-address outputting section 405 is expressed as 2 in X direction and 2 in Y direction. The value of the related motion vector 45 which is calculated by the agreement-address outputting section 405 is equal to $\sqrt{8}$.

The motion-vector information generated by the agreement-address outputting section 405 has not only components caused by motions of objects but also components caused by a shake of the apparatus body (that is, a shake of the imaging element array 32). Generally, motion vectors equal in direction and value are caused by a shake of the apparatus body for a half or more of the representative points in one frame. On the other hand, such motion vectors are hardly caused by motions of objects.

The first calculating section 376 provided by the microcomputer 37 averages the motion-vector information from the EIS circuit 40 for all the representative points in one frame to generate averaged motion-vector information. The integrating circuit 377 provided by the microcomputer 37 integrates the motion-vector information from the EIS circuit 40 throughout each of the division-result rectangles to generate integrated motion-vector information. The integrated motion-vector information indicates motion vectors for the respective division-result rectangles. The second calculating section 378 provided by the microcomputer 37 calculates the difference between the averaged motion-vector information and the integrated motion-vector information to generate difference motion-vector information for each of the division-result rectangles. Thereby, components caused by a shake of the apparatus body (that is, a shake of the imaging element array 32) are removed from the motion-vector information. Accordingly, main components of the difference motion-vector information reflect motions of objects.

The pattern collating section 379 provided by the microcomputer 37 operates in preset one of a first pattern choice mode and a second pattern choice mode. The first pattern choice mode is designed so that a greater weight will be given to the maximum-value motion vector (the greatest-moving object) among motion vectors indicated by the difference motion-vector information. The second pattern choice mode is designed so that a greater weight will be given to a stationary object.

During the first pattern choice mode of operation, the pattern collating section 379 normalizes the values of the motion vectors indicated by the difference motion-vector information. In the normalization, the value of the greatest motion vector is set to 1.00. In other words, the value of the motion vector in a division-result rectangle containing the greatest-moving object is set to 1.00. The pattern collating section 379 labels the normalized values of the motion vectors as the after-normalization variable quantities for the respective division-result rectangles. The pattern collating section 379 obtains a pattern model from the after-normalization variable quantities for the respective division-result rectangles as the calculating section 373 in FIG. 17 does.

Generally, the second pattern choice mode of operation of the pattern collating section 379 is suited to image capturing conditions where the user continues to take images of a moving object while trying to hold the object in a fixed place (for example, a central place) relative to frame. During the second pattern choice mode of operation, the pattern collating section 379 scales the values of the motion vectors indicated by the difference motion-vector information. In the scaling, the value of the smallest motion vector is set to 1.00. In other words, the value of the motion vector in a division-result rectangle occupied by a hardly moving object is set to 1.00. The pattern collating section 379 labels the normalized value of the smallest motion vector as the after-normalization variable quantity for the related division-result rectangle. The pattern collating section 379 subtracts the values of the other motion vectors from 1.00. The pattern collating section 379 labels the subtraction-result values of the motion vectors as the after-normalization variable quantities for the respective related division-result rectangles. The pattern collating section 379 obtains a pattern model from the after-normalization variable quantities for the respective division-result rectangles as the calculating section 373 in FIG. 17 does.

The TG-drive-pattern choosing section 375 provided by the microcomputer 37 chooses one among the pixel-selection-pattern tables in the pattern-table storing section 374 in response to the pattern model obtained by the pattern collating section 379. The TG-drive-pattern choosing section 375 notifies the chosen pixel-selection-pattern table to the driving section 39.

As understood from the above description, optimum one is chosen among the pixel-selection-pattern tables in the pattern-table storing section 374 in response to the motion-vector information generated by the EIS circuit 40. Thereby, it is possible to easily implement the weighted readout of signals from photosensor pixels in the imaging element array 32. It is possible to dispense with a mechanical shutter. Preferably, the number of selected and used photosensor pixels from which signals are read out is constant. In this case, the frequency of the drive of the imaging element array 32 can be fixed.

Fifth Embodiment

A fifth embodiment of this invention is based on one of the first to fourth embodiments thereof. According to the fifth embodiment of this invention, an imaging element array has a matrix of 20 by 20 photosensor pixels where every pixel is formed by one R cell, one G cell, or one B cell.

Figure 32:
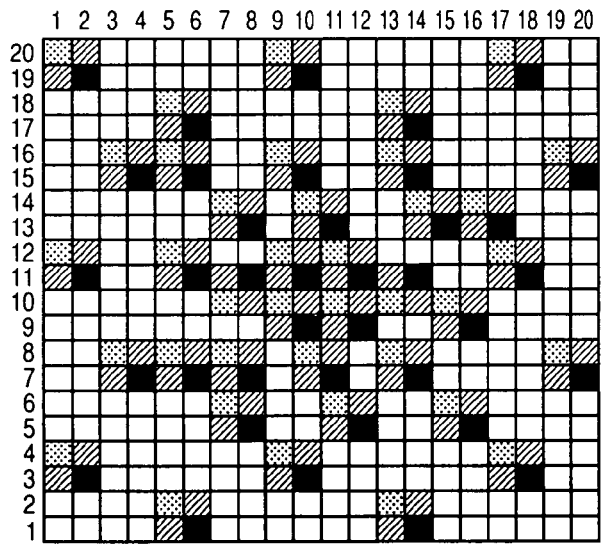
FIGS. 32, 33, and 34 are diagrams of first, second, and third examples of a pixel selection pattern applied to an imaging element array in a fifth embodiment of this invention, respectively.
Figure 33:
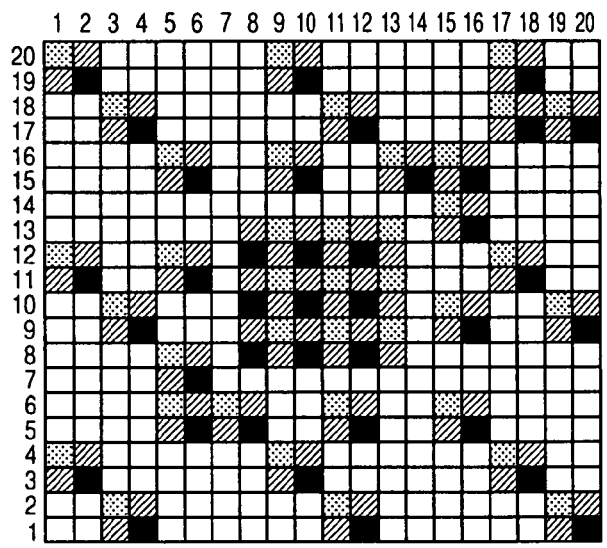
Figure 34:
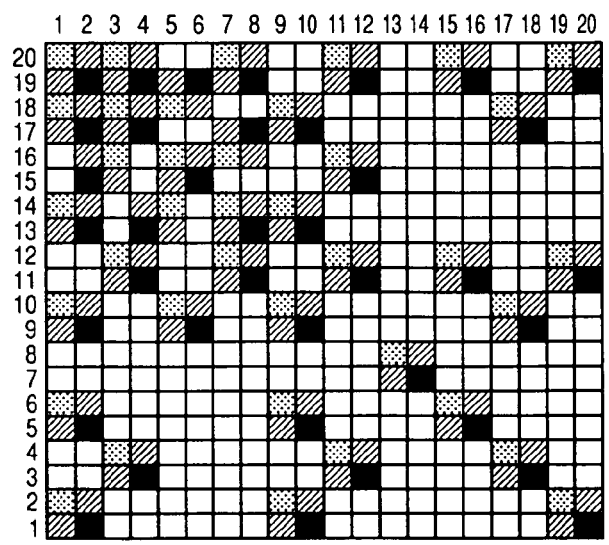

FIGS. 32, 33, and 34 show first, second, and third examples of a pixel selection pattern applied to the imaging element array. There are groups each having a left-upper R pixel, a right-upper G pixel, a left-lower G pixel, and a right-lower B pixel. Signals are read out from only pixel groups selected among all the pixel groups. In FIGS. 32, 33, and 34, the number of the pixel groups from which the signals are read out is equal to 152.

In FIG. 32, regarding the signal readout, the weighting factor (the thinning-out factor) at a place gradually decreases as the place moves from the center of the imaging element array to an edge thereof.

The pixel selection pattern in FIG. 33 is similar to the pixel selection pattern in FIG. 32 except that a 4/6 selection area where signals are read out from 4 pixel groups per 6 every pixel groups is absent therefrom.

In FIG. 34, regarding the signal readout, the weighting factor (the thinning-out factor) at a place gradually decreases as the place moves from the left-upper corner of the imaging element array to the right-lower corner thereof.

With reference back to FIG. 32, a first area extends in a central part of the imaging element array, and occupies vertical-direction addresses of 9-12 and horizontal-direction addresses of 9-12. Signals are read out from all the pixel groups in the first area. A second area surrounds the first area, and occupies vertical-direction addresses of 7-8 and 13-14 and horizontal-direction addresses of 7-8 and 13-14. Signals are read out from 4 pixel groups per every 6 pixel groups in the second area. A third area surrounds the second area, and occupies vertical-direction addresses of 5-6 and 15-16 and horizontal-direction addresses of 5-6 and 15-16. Signals are read out from 4 pixel groups per every 8 pixel groups in the third area. A fourth area surrounds the third area. Signals are read out from 4 pixel groups per every 16 pixel groups in the fourth area.

In FIG. 33, there are three areas different in weighting factor or thinning-out factor. The pixel selection pattern of FIG. 33 is similar to the pixel selection pattern of FIG. 32 except that a 4/6 selection area is absent therefrom.

In FIG. 34, a first area extends in a left-upper corner of the imaging element array, and occupies vertical-direction addresses of 17-20 and horizontal-direction addresses of 1-4. Signals are read out from all the pixel groups in the first area. A second area extends at the right and lower sides of the first area, and occupies vertical-direction addresses of 13-16 and horizontal-direction addresses of 5-8. Signals are read out from 4 pixel groups per every 6 pixel groups in the second area. A third area extends at the right and lower sides of the second area, and occupies vertical-direction addresses of 9-12 and horizontal-direction addresses of 9-12. Signals are read out from 4 pixel groups per every 8 pixel groups in the third area. A fourth area extends at right and lower sides of the third area. Signals are read out from 4 pixel groups per every 16 pixel groups in the fourth area.

Sixth Embodiment

A sixth embodiment of this invention is based on one of the first to fourth embodiments thereof. The features of the sixth embodiment of this invention are indicated below.

Figure 35:
FIG. 35 is a diagram showing signal readout patterns (pixel selection patterns) applied to an imaging element array in a sixth embodiment of this invention.

During the external mode 41 of operation, one is chosen among a plurality of previously-prepared pixel-selection-pattern tables in accordance with user's request. The signal readout pattern determined by the chosen pixel-selection-pattern table is applied to the imaging element array. FIG. 35 shows first, second, and third examples A1, A2, and A3 of the signal readout pattern determined by the chosen pixel-selection-pattern table. According to the signal readout pattern A1, the photo-electric conversion surface of the imaging element array is not virtually divided and signals are read out from 4 pixel groups per every 8 pixel groups in the photo-electric conversion surface of the imaging element array. According to the signal readout pattern A2, the photo-electric conversion surface of the imaging element array is virtually divided into a central area and a peripheral area extending around the central area. Signals are read out from 4 pixel groups per every 6 pixel groups in the central area. Signals are read out from 4 pixel groups per every 8 pixel groups in the peripheral area. According to the signal readout pattern A3, the photo-electric conversion surface of the imaging element array is virtually divided into first, second, and third areas. The first area occupies a central part of the photo-electric conversion surface of the imaging element array. The second area surrounds the first area. The third area surrounds the second area. Signals are read out from 4 pixel groups per every 4 pixel groups in the first area. In other words, signals are read out from all pixel groups in the first area. Signals are read out from 4 pixel groups per every 8 pixel groups in the second area. Signals are read out from 4 pixel groups per every 16 pixel groups in the third area. According to the signal readout patterns A2 and A3, the effective resolution at a place decreases as the place moves from the center of the photo-electric conversion surface of the imaging element array to an edge thereof.

During the optical zoom mode 44 of operation, one is chosen among a plurality of previously-prepared pixel-selection-pattern tables in accordance with conditions of the optical zoom. Basically, a zoom power is detected as subject information used for the pattern choice. FIG. 35 shows first and second examples B1 and B2 of the signal readout pattern determined by the chosen pixel-selection-pattern table. The signal readout pattern B1 is used under a wide state where the zoom power is relatively low. The signal readout pattern B2 is used when the zoom power is relatively high. According to the signal readout pattern B1, the photo-electric conversion surface of the imaging element array is not virtually divided and signals are read out from 4 pixel groups per every 6 pixel groups in the photo-electric conversion surface of the imaging element array. According to the signal readout pattern B2, the photo-electric conversion surface of the imaging element array is virtually divided into a relatively-narrow central area and a peripheral area extending around the central area. Signals are read out from 4 pixel groups per every 4 pixel groups in the central area. In other words, signals are read out from all pixel groups in the central area. Signals are read out from 4 pixel groups per every 16 pixel groups in the peripheral area.

One may be chosen among a plurality of previously-prepared pixel-selection-pattern tables in accordance with the motion-vector information outputted from the EIS circuit. FIG. 35 shows first and second examples C1 and C2 of the signal readout pattern determined by the chosen pixel-selection-pattern table. The signal readout pattern C1 is used when the maximum one of the values of the motion vectors detected by the EIS circuit is in a central part of a frame. The signal readout pattern C2 is used when the maximum one of the values of the motion vectors detected by the EIS circuit is in a left-upper corner of a frame. According to the signal readout pattern C1, the photo-electric conversion surface of the imaging element array is virtually divided into first, second, and third areas. The first area occupies a central part of the photo-electric conversion surface of the imaging element array. The first area is relatively narrow. The second area surrounds the first area. The third area surrounds the second area. Signals are read out from 4 pixel groups per every 4 pixel groups in the first area. In other words, signals are read out from all pixel groups in the first area. Thus, the first area is a high-resolution area. Signals are read out from 4 pixel groups per every 6 pixel groups in the second area. Signals are read out from 4 pixel groups per every 16 pixel groups in the third area. According to the signal readout pattern C1, the effective resolution at a place decreases as the place moves from the center of the photo-electric conversion surface of the imaging element array to an edge thereof. According to the signal readout pattern C2, the photo-electric conversion surface of the imaging element array is virtually divided into first, second, and third areas. The first area occupies a left-upper corner of the photo-electric conversion surface of the imaging element array. The first area is relatively narrow. The second area extends at the right and lower sides of the first area. The third area extends at the right and lower sides of the second area. Signals are read out from 4 pixel groups per every 4 pixel groups in the first area. In other words, signals are read out from all pixel groups in the first area. Thus, the first area is a high-resolution area. Signals are read out from 4 pixel groups per every 6 pixel groups in the second area. Signals are read out from 4 pixel groups per every 16 pixel groups in the third area. According to the signal readout pattern C2, the effective resolution at a place decreases as the place moves from the left-upper corner of the photo-electric conversion surface of the imaging element array to the right-lower corner thereof.

One may be chosen among a plurality of previously-prepared pixel-selection-pattern tables in accordance with the information representative of the variable quantities given by the AF circuit. FIG. 35 shows first and second examples D1 and D2 of the signal readout pattern determined by the chosen pixel-selection-pattern table. The signal readout pattern D1 is used when the maximum one of the variable quantities is in a central part of a frame. The signal readout pattern D2 is used when the maximum one of the variable quantities is in a left-upper corner of a frame. According to the signal readout pattern D1, the photo-electric conversion surface of the imaging element array is virtually divided into first, second, and third areas. The first area occupies a central part of the photo-electric conversion surface of the imaging element array. The first area is relatively narrow. The second area surrounds the first area. The third area surrounds the second area. Signals are read out from 4 pixel groups per every 4 pixel groups in the first area. In other words, signals are read out from all pixel groups in the first area. Thus, the first area is a high-resolution area. Signals are read out from 4 pixel groups per every 8 pixel groups in the second area. Signals are read out from 4 pixel groups per every 16 pixel groups in the third area. According to the signal readout pattern D1, the effective resolution at a place decreases as the place moves from the center of the photo-electric conversion surface of the imaging element array to an edge thereof. According to the signal readout pattern D2, the photo-electric conversion surface of the imaging element array is virtually divided into first, second, and third areas. The first area occupies a left-upper corner of the photo-electric conversion surface of the imaging element array. The first area is relatively narrow. The second area extends at the right and lower sides of the first area. The third area extends at the right and lower sides of the second area. Signals are read out from 4 pixel groups per every 4 pixel groups in the first area. In other words, signals are read out from all pixel groups in the first area. Thus, the first area is a high-resolution area. Signals are read out from 4 pixel groups per every 8 pixel groups in the second area. Signals are read out from 4 pixel groups per every 16 pixel groups in the third area. According to the signal readout pattern D2, the effective resolution at a place decreases as the place moves from the left-upper corner of the photo-electric conversion surface of the imaging element array to the right-lower corner thereof.

The face detection circuit 253 extracts high-frequency components from the luminance signal Y and the chrominance difference signals C generated by the Y/C processing section 24, and responds to the extracted high-frequency components. Specifically, the face detection circuit 253 detects a human-skin-color portion of the captured image represented by the luminance signal Y and the chrominance difference signals C. The face detection circuit 253 decides whether low-luminance-level zones corresponding to human eyes are present in or absent from the detected human-skin-color portion of the captured image. When such low-luminance-level zones are present in the human-skin-color image portion, the face detection circuit 253 concludes that the human-skin-color image portion corresponds to a human face. Otherwise, the face detection circuit 253 concludes that the human-skin-color image portion does not correspond to a human face.

One may be chosen among a plurality of previously-prepared pixel-selection-pattern tables in accordance with a human face or faces detected by the face detection circuit 253. FIG. 35 shows first, second, and third examples E1, E2, and E3 of the signal readout pattern determined by the chosen pixel-selection-pattern table. The signal readout pattern E1 is used when a detected human face is in a right-lower part of a frame. The signal readout pattern E2 is used when a detected human face is a left-lower part of a frame. The signal readout pattern E3 is used when a first detected human face is in a right-lower part of a frame and a second detected human face is in a left-lower part thereof. According to the signal readout pattern E1, the photo-electric conversion surface of the imaging element array is virtually divided into first, second, third, and fourth areas. The first area occupies a right-lower part of the photo-electric conversion surface of the imaging element array. The first area corresponds in place and size to the detected human face. The second area surrounds the first area. The third area surrounds the second area. The fourth area surrounds the third area. Signals are read out from 4 pixel groups per every 4 pixel groups in the first area. In other words, signals are read out from all pixel groups in the first area. Thus, the first area is a high-resolution area. Signals are read out from 4 pixel groups per every 6 pixel groups in the second area. Signals are read out from 4 pixel groups per every 8 pixel groups in the third area. Signals are read out from 4 pixel groups per every 16 pixel groups in the fourth area. According to the signal readout pattern E1, the effective resolution at a place decreases as the place moves from the right-lower corner of the photo-electric conversion surface of the imaging element array to the left-upper corner thereof. According to the signal readout pattern E2, the photo-electric conversion surface of the imaging element array is virtually divided into first, second, third, and fourth areas. The first area occupies a left-lower part of the photo-electric conversion surface of the imaging element array. The first area corresponds in place and size to the detected human face. The second area surrounds the first area. The third area surrounds the second area. The fourth area surrounds the third area. Signals are read out from 4 pixel groups per every 4 pixel groups in the first area. In other words, signals are read out from all pixel groups in the first area. Thus, the first area is a high-resolution area. Signals are read out from 4 pixel groups per every 6 pixel groups in the second area. Signals are read out from 4 pixel groups per every 8 pixel groups in the third area. Signals are read out from 4 pixel groups per every 16 pixel groups in the fourth area. According to the signal readout pattern E2, the effective resolution at a place decreases as the place moves from the left-lower corner of the photo-electric conversion surface of the imaging element array to the right-upper corner thereof. According to the signal readout pattern E3, the photo-electric conversion surface of the imaging element array is virtually divided into first, second, third, fourth, and fifth areas. The first area occupies a right-lower part of the photo-electric conversion surface of the imaging element array. The first area corresponds in place and size to the first detected human face. The second area occupies a left-lower part of the photo-electric conversion surface of the imaging element array. The second area corresponds in place and size to the second detected human face. The third area surrounds the first area. The fourth area surrounds the second area. The fifth area surrounds the third and fourth areas. Signals are read out from 4 pixel groups per every 4 pixel groups in the first area. In other words, signals are read out from all pixel groups in the first area. Thus, the first area is a high-resolution area. Signals are read out from 4 pixel groups per every 4 pixel groups in the second area. In other words, signals are read out from all pixel groups in the second area. Thus, the second area is another high-resolution area. Signals are read out from 4 pixel groups per every 8 pixel groups in the third area. Signals are read out from 4 pixel groups per every 8 pixel groups in the fourth area. Signals are read out from 4 pixel groups per every 16 pixel groups in the fifth area. The signal readout patterns E1, E2, and E3 are equal in number of selected and used photosensor pixels in the imaging element array.

Seventh Embodiment

A seventh embodiment of this invention is similar to one of the first to sixth embodiments thereof except that an imaging element array has photosensor pixels whose number is in a range corresponding to pictures other than a high definition picture and an ultra-high definition picture.

Eighth Embodiment

An eighth embodiment of this invention is similar to one of the first to seventh embodiments thereof except that a randomly-accessible image sensor other than a CMOS image sensor is used as an imaging element array.

What is claimed is:

1. A method of taking a picture, comprising the steps of:
    dividing an image capturing region in an imaging element array into division-result areas;
    providing a first pattern defining a ratio of a number of photosensor pixels used to capture an image to a number of all photosensor pixels in each of the division-result areas, the ratio varying from division-result area to division-result area;
    driving the imaging element array in accordance with the first pattern and thereby generating a first picture signal responsive to the ratio for each of the division-result areas;
    implementing interpolation responsive to the first picture signal generated by the used photosensor pixels to generate a second picture signal corresponding to unused ones among all the photosensor pixels in each of the division-result areas; and
    combining the first picture signal and the second picture signal into a first captured-image signal, and outputting the first captured-image signal.

2. A method as recited in claim 1, further comprising the steps of:
    providing a second pattern defining a ratio of a number of photosensor pixels used to capture an image to a number of all photosensor pixels in the image capturing region;
    driving the imaging element array in accordance with the second pattern and thereby generating a third picture signal responsive to the ratio defined by the second pattern;
    implementing interpolation responsive to the third picture signal generated by the used photosensor pixels to generate a fourth picture signal corresponding to unused ones among all the photosensor pixels in the image capturing region; and combining the third picture signal and the fourth picture signal into a second captured-image signal, and outputting the second captured-image signal.

3. A method as recited in claim 2, further comprising the steps of:

providing different candidate patterns for the second pattern; and selecting one from the candidate patterns and using the selected candidate pattern as the second pattern.

4. A method as recited in claim 1, further comprising the steps of:

providing candidate patterns for the first pattern; and selecting one from the candidate patterns and using the selected candidate pattern as the first pattern;

wherein the candidate patterns differ from each other in number of the division-result areas and ratio of a number of photosensor pixels used to capture an image to a number of all photosensor pixels in each of the division-result areas.

5. An apparatus for taking a picture, comprising:

an imaging element array having a matrix of photosensor pixels and having an image capturing region;

means for dividing the image capturing region into division-result areas;

means for providing a first pattern defining a ratio of a number of photosensor pixels used to capture an image to a number of all photosensor pixels in each of the division-result areas, the ratio varying from division-result area to division-result area;

means for driving the imaging element array in accordance with the first pattern and thereby generating a first picture signal responsive to the ratio for each of the division-result areas;

means for implementing interpolation responsive to the first picture signal generated by the used photosensor pixels to generate a second picture signal corresponding to unused ones among all the photosensor pixels in each of the division-result areas; and means for combining the first picture signal and the second picture signal into a first captured-image signal, and outputting the first captured-image signal.

6. An apparatus as recited in claim 5, further comprising:

means for providing a second pattern defining a ratio of a number of photosensor pixels used to capture an image to a number of all photosensor pixels in the image capturing region;

means for driving the imaging element array in accordance with the second pattern and thereby generating a third picture signal responsive to the ratio defined by the second pattern;

means for implementing interpolation responsive to the third picture signal generated by the used photosensor pixels to generate a fourth picture signal corresponding to unused ones among all the photosensor pixels in the image capturing region; and means for combining the third picture signal and the fourth picture signal into a second captured-image signal, and outputting the second captured-image signal.

7. An apparatus as recited in claim 6, further comprising:

means for providing different candidate patterns for the second pattern; and means for selecting one from the candidate patterns and using the selected candidate pattern as the second pattern.

8. An apparatus as recited in claim 5, further comprising:

means for providing candidate patterns for the first pattern; and means for selecting one from the candidate patterns and using the selected candidate pattern as the first pattern;

wherein the candidate patterns differ from each other in number of the division-result areas and ratio of a number of photosensor pixels used to capture an image to a number of all photosensor pixels in each of the division-result areas.

* * * * *